(12) United States Patent
Li et al.

(10) Patent No.: US 9,232,506 B2
(45) Date of Patent: Jan. 5, 2016

(54) COMMUNICATION METHOD AND APPARATUS FOR CARRIER AGGREGATION SYSTEM

(71) Applicant: Huawei Technologies Co., LTD, Shenzhen (CN)

(72) Inventors: Bo Li, Beijing (CN); Lei Guan, Beijing (CN); Yongxia Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 13/975,212

(22) Filed: Aug. 23, 2013

(65) Prior Publication Data

US 2013/0336267 A1    Dec. 19, 2013

Related U.S. Application Data

(63) Continuation of application No. PCT/CN2012/071592, filed on Feb. 24, 2012.

(30) Foreign Application Priority Data

Feb. 24, 2011  (CN) .......................... 2011 1 0045513
Jan. 21, 2012  (CN) .......................... 2012 1 0019206

(51) Int. Cl.
*H04Q 9/00*         (2006.01)
*H04W 72/04*    (2009.01)
(Continued)

(52) U.S. Cl.
CPC ......... *H04W 72/0406* (2013.01); *H04L 1/1854* (2013.01); *H04W 72/1289* (2013.01)

(58) Field of Classification Search
CPC ... H04L 1/1607; H04L 1/1614; H04L 1/1621; H04L 1/1861; H04L 5/0055; H04L 5/14; H04J 3/1694; H04W 36/0072; H04W 72/0406
USPC ......................................................... 370/329
See application file for complete search history.

(56) References Cited

U.S. PATENT DOCUMENTS

2010/0210256 A1*  8/2010  Shen et al. ................. 455/422.1
2011/0201367 A1   8/2011  Aminaka et al.
(Continued)

FOREIGN PATENT DOCUMENTS

| CN | 1758813 A    | 4/2006  |
|----|--------------|---------|
| CN | 101588224 A  | 11/2009 |
| CN | 101651895 A  | 2/2010  |

(Continued)

OTHER PUBLICATIONS

Huawei, et al., "ACK/NACK feedback with channel selection for TDD," 3GPP TSG RAN WG1 Meeting #63, R1-106152, Jacksonville, Florida, Nov. 15-19, 2010, 5 pages.
(Continued)

*Primary Examiner* — Wanda Z Russell
(74) *Attorney, Agent, or Firm* — Slater & Matsil, L.L.P.

(57) ABSTRACT

Embodiments of the present invention provide a communication method for a carrier aggregation system. The communication method includes receiving physical downlink share channel PDSCH information sent by a base station through a subframe n of a secondary cell. If a subframe n of a primary cell is a downlink subframe, an ACK/NACK of the sent PDSCH information is fed back on a subframe m or a subframe p of the primary cell.

12 Claims, 10 Drawing Sheets

(51) Int. Cl.
*H04L 1/18* (2006.01)
*H04W 72/12* (2009.01)

(56) References Cited

U.S. PATENT DOCUMENTS

2013/0215865 A1* 8/2013 Lee et al. .................. 370/329
2013/0223300 A1* 8/2013 Yang et al. ................ 370/280

FOREIGN PATENT DOCUMENTS

| CN | 101958775 A | 1/2011 |
| CN | 101959319 A | 1/2011 |
| CN | 101964698 A | 2/2011 |
| WO | 2010061503 A1 | 6/2010 |
| WO | 2010069422 A1 | 6/2010 |

OTHER PUBLICATIONS

Extended European Search Report received in Application No. 12749909.3-1851 mailed Jan. 27, 2014, 15 pages.
Panasonic, "UL ACK/NACK Transmission on PUCCH for carrier aggregation," 3GPP TSG-RAN WG1 Meeting #57, R1-091744, San Francisco, California, May 4-8, 2009, 3 pages.
Huawei, et al., "Details on ACK/NACK time domain bundling for TDD," 3GPP TSG RAN WG1 Meeting #63bis, R1-110415, Dublin, Ireland, Jan. 17-21, 2011, 4 pages.
3rd Generation Partnership Project; Technical Specification Group Radio Access Network; Evolved Universal Terrestrial Radio Access (E-UTRA); Physical layer procedures (Release 10), 3GPP TS 36.213 V10.0.1, Dec. 2010, 98 pages.
International Search Report and Written Opinion received in Application No. PCT/CN2012/071592 mailed May 24, 2012, 15 pages.

* cited by examiner

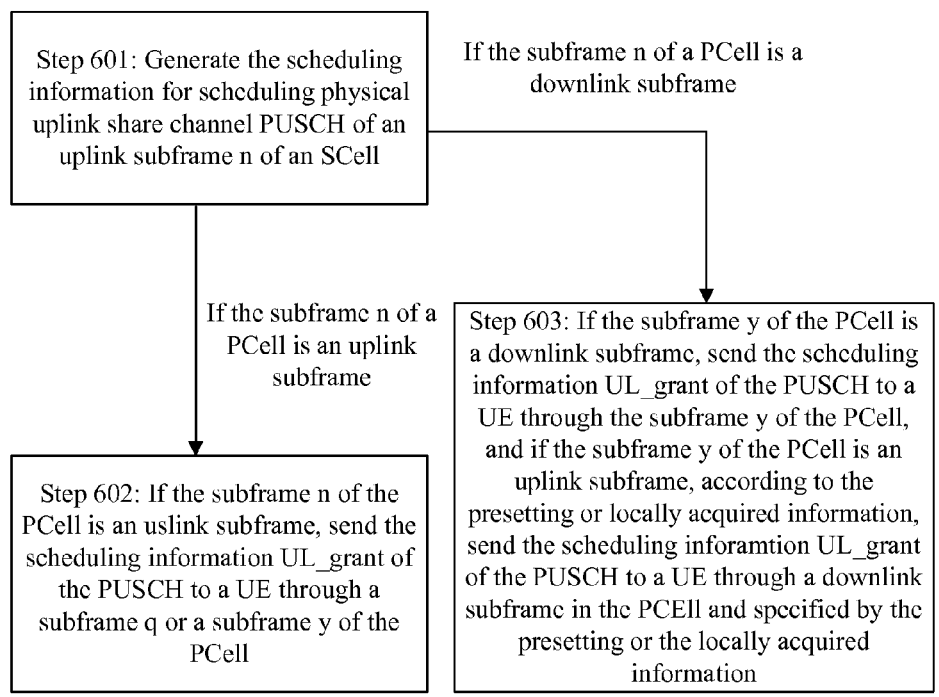

| Subframe index | 0 | 1 | 2 | 3 | 4 | 5 | 6 | 7 | 8 | 9 |
|---|---|---|---|---|---|---|---|---|---|---|
| Configuration 1 (PCC) | | | 6 | 9 | | | | 1 | 4 | |
| Configuration 2 (SCC) | | | 8 | | | | | 3 | | |

| Subframe index | 0 | 1 | 2 | 3 | 4 | 5 | 6 | 7 | 8 | 9 |
|---|---|---|---|---|---|---|---|---|---|---|
| Configuration 2 (SCC) | | | 8 | | | | | 3 | | |
| Configuration5 (PCC) | | | 8 | | | | | | | |

| | 0 | 1 | 2 | 3 | 4 | 5 | 6 | 7 | 8 | 9 |
|---|---|---|---|---|---|---|---|---|---|---|
| Configuration 1 (primary cell) | D | S | U(5,6) | U(9) | D | D | S | U(0,1) | D(4) | D |
| Configuration 3 (secondary cell) | D | S | U(1,5,6) | U(7,8) | U(9,0) | D | D | D | D | D |
| Configuration 4 (referent configuration 1) | D | S | U(0,1,4,5) | U(6,7,8,9) | D | D | D | D | D | D |
| Configuration 5 (referent configuration 2) | D | S | U(0,1,3,4,5,6,7,8,9) | D | D | D | D | D | D | D |

FIG 16

| Configuration 0 (primary cell) | 0 | 1 | 2 | 3 | 4 | 5 | 6 | 7 | 8 | 9 |
|---|---|---|---|---|---|---|---|---|---|---|
| | D | S | U(5,6) | U(6) | U(0) | D | S | U(0,1) | U(1) | U(5) |

| Configuration 2 (secondary cell) | 0 | 1 | 2 | 3 | 4 | 5 | 6 | 7 | 8 | 9 |
|---|---|---|---|---|---|---|---|---|---|---|
| | D | S | U(6) | U(9) | D | D | S | U(1) | U(4) | D |

FIG. 23

| Configuration 0 (primary cell) | 0 | 1 | 2 | 3 | 4 | 5 | 6 | 7 | 8 | 9 |
|---|---|---|---|---|---|---|---|---|---|---|
| | D | S | U(5,6) | U(6) | U(0) | D | S | U(0,1) | U(1) | U(5) |

| Configuration 2 (secondary cell) | | | | | | | | | | |
|---|---|---|---|---|---|---|---|---|---|---|
| | D | S | U(8) | D | D | D | S | U(3) | D | D |

| Configuration 1 (reference configuration) | | | | | | | | | | |
|---|---|---|---|---|---|---|---|---|---|---|
| | D | S | U(6) | U(9) | D | D | S | U(1) | U(4) | D |

FIG. 24

| Configuration 2 (primary cell) | 0 | 1 | 2 | 3 | 4 | 5 | 6 | 7 | 8 | 9 |
|---|---|---|---|---|---|---|---|---|---|---|
| | D | S | U(8) | D | D | D | S | U(3) | D | D |

PHICH at 3 (from primary), No PHICH at 4, PHICH at 8, No PHICH at 9

| Configuration 1 (secondary cell) | | | | | | | | | | |
|---|---|---|---|---|---|---|---|---|---|---|
| | D | S | U(6) | U(9) | D | D | S | U(1) | U(4) | D |

FIG. 25

COMMUNICATION METHOD AND APPARATUS FOR CARRIER AGGREGATION SYSTEM

CROSS-REFERENCE TO RELATED APPLICATIONS

This application is a continuation of International Application No. PCT/CN2012/071592, filed on Feb. 24, 2012, which claims priority to Chinese Patent Application No. 201110045513.0, filed on Feb. 24, 2011 and Chinese Patent Application No. 201210019206.X, filed on Jan. 21, 2012, all of which are hereby incorporated by reference in their entireties.

TECHNICAL FIELD

The present invention relates to the field of communication technologies, and in particular, to a communication method and an apparatus for a carrier aggregation system.

BACKGROUND

For a long term evolution LTE (Long Term Evolution) version 8 (Release 8, R8) system, a base station and a user equipment (UE) communicate and transmit data on a carrier. The base station schedules the UE by a physical downlink control channel PDCCH (Physical Downlink Control Channel). The PDCCH may be downlink scheduling grant (DL_grant) or uplink scheduling grant (UL_grant) information, respectively carrying time frequency resource distribution scheduling information and the like for indicating a physical downlink share channel PDSCH (Physical Downlink Shared Channel) or a physical uplink share channel PUSCH (Physical Uplink Shared Channel). The UE, after receiving and decoding the PDCCH, according to the carried scheduling information, receives downlink data PDSCH or sends uplink data PUSCH, and thereafter, the UE feeds back uplink ACK/NACK (AN) for the downlink data, where feeding back ACK indicates determining receiving or receiving success and feeding back NACK indicates that no determining receiving or receiving failure. The base station, after receiving the uplink data, feeds back downlink AN. PDCCH and its scheduled PDSCH or PUSCH, and PDSCH and its corresponding uplink AN have a certain timing relationship, that is, or sequential relationship.

To increase a peak rate and meet the requirement of the future communication system for a data rate, an enhanced long term evolution LTE-A (Long Term Evolution Advanced) system introduces the carrier aggregation CA (Carrier Aggregation) technology, that is, allocating member carriers (Component Carrier, CC) to one UE for supporting a higher rate of data transmission. For example, an LTE version 10 (Release 10, R10) system configures a plurality of carriers for a UE, including a pair of uplink and downlink primary carriers (Primary CC, PCC) and the remaining carriers are secondary carriers (Secondary CC or SCC), where a PCC is also called a primary cell (PCell) and an SCC is also called a secondary cell (SCell), and an uplink AN of the UE can only be sent in an uplink PCell. Additionally, in a carrier aggregation scenario, an LTE R10 system supports cross-carrier scheduling, that is, sending the PDCCH of a plurality of carriers for scheduling a UE to a certain or several carriers, such as a PCell.

In a TDD CA system where a plurality of carriers has different UL-DL configurations, because the UL-DL configuration of a PCell and that of an SCell are different, according to the SCell timing relationship, communication between the base station and the UE through the SCell may be not normally performed.

SUMMARY OF THE INVENTION

Embodiments of the present invention are mainly for providing a communication method and an apparatus for a CA system to effectively ensure normal communication between the base station and the UE.

In one aspect, an embodiment of the present invention provides a communication method for a CA system. If a subframe n of a primary cell is a downlink subframe, an ACK/NACK of the sent PDSCH information is fed back on a subframe m or a subframe p of the primary cell. The m, determined according to the ACK/NACK timing relationship to which the subframe n of the primary cell corresponds, is a subframe index of a subframe that feeds back the ACK/NACK of the PDSCH of the subframe n of the primary cell in the primary cell and the p, determined according to the ACK/NACK timing relationship to which the subframe n of the secondary cell corresponds, is a subframe index of a subframe that feeds back the ACK/NACK of the PDSCH of the subframe n of the secondary cell in the secondary cell. In this case, n, m, and p are subframe indexes.

In one aspect, an embodiment of the present invention provides a communication method for a CA system. Physical downlink share channel PDSCH information sent by a base station through a subframe n of a secondary cell is received. When the subframe n is an uplink subframe in a primary cell, if a subframe p is an uplink subframe in a primary cell, an ACK/NACK of the sent PDSCH information is fed back on the subframe p of the primary cell. Alternatively, if the subframe p in a primary cell is a downlink subframe, according to presetting or a notification of the base station, an ACK/NACK of the sent PDSCH information is fed back on a subframe in a primary cell and specified by the presetting or on the notification of the base station. The p, determined according to the ACK/NACK timing relationship to which the subframe n of the secondary cell corresponds, is a subframe index of a subframe that feeds back the ACK/NACK of the PDSCH of the subframe n of the secondary cell in a secondary cell, and n and p are subframe indexes.

In one aspect, an embodiment of the present invention provides a communication method for a CA system. Physical downlink share channel (PDSCH) information sent by a base station through a subframe n of a secondary cell is received. When the subframe n is an uplink subframe in a primary cell, if a subframe p is an uplink subframe in a primary cell, an ACK/NACK of the sent PDSCH information is fed back on the subframe p of the primary cell. Alternatively, if the subframe p in a primary cell is a downlink subframe, according to a presetting or a notification of the base station, an ACK/NACK of the sent PDSCH information is fed back on an uplink subframe in a primary cell and specified by the presetting or the notification of the base station. The p, determined according to the ACK/NACK timing relationship to which the subframe n of the secondary cell corresponds, is a subframe index of a subframe that feeds back the ACK/NACK of the PDSCH of the subframe n of the secondary cell in a secondary cell, and n and p are subframe indexes.

In one aspect, an embodiment of the present invention provides a communication method for a CA system. Physical downlink share channel (PDSCH) information is sent to a user equipment through a subframe n of a secondary cell. When the subframe n is an uplink subframe in a primary cell, if a subframe p is an uplink subframe in a primary cell, an ACK/NACK of the PDSCH information sent by the user equipment on the subframe p in a primary cell is received. Alternatively, if the subframe p in a primary cell is a downlink subframe, an ACK/NACK of the PDSCH information that is sent, according to a presetting or a notification of the base station, by a user equipment on an uplink subframe in a primary cell is received. The ACK/NACK is specified by the presetting or the notification of the base station. The p, determined according to the ACK/NACK timing relationship to which the subframe n of the secondary cell corresponds, is a subframe index of a subframe that feeds back the ACK/NACK of the PDSCH of the subframe n of the secondary cell in a secondary cell, and n and p are subframe indexes.

After adopting foregoing technical solutions, the communication method provided by the embodiment of the present invention for a CA system, in the CA system where each carrier has a distinct UL-DL configuration, can effectively ensure that an uplink AN to which an SCell corresponds is normally fed back and further that normal communication between the base station and the UE.

In another aspect, an embodiment of the present invention further provides a communication method for a CA system. Scheduling information UL_grant for scheduling PUSCH of an uplink subframe n of a secondary cell of a user equipment is generated. If a subframe n of a primary cell is an uplink subframe, the scheduling information UL_grant of the PUSCH is sent to the user equipment through a subframe q or a subframe y of the primary cell. The q, determined according to the UL_grant timing relationship to which the subframe n of the primary cell corresponds, is a subframe index of a subframe that sends the scheduling information UL_grant of the PUSCH of the subframe n of the primary cell, and the y, determined according to the UL_grant timing relationship to which the subframe n of the secondary cell corresponds, is a subframe index of a subframe that sends the scheduling information UL_grant of the PUSCH of the subframe n of the secondary cell. Alternatively, when the subframe n of the primary cell is a downlink subframe, if the subframe y of the primary cell is a downlink subframe, the scheduling information UL_grant of the PUSCH is sent to the user equipment through the subframe y of the primary cell. Alternatively, if the subframe y of the primary cell is an uplink subframe, according to presetting or locally acquired information, the scheduling information UL_grant of the PUSCH is sent to the user equipment through a downlink subframe in a primary cell and specified by the presetting or the locally acquired information. The y, determined according to the UL_grant timing relationship to which the subframe n of the secondary cell corresponds, is a subframe index of a subframe that sends the scheduling information UL_grant of the PUSCH of the subframe n of the secondary cell, and, n, q, and y are subframe indexes.

In another aspect, an embodiment of the present invention further provides a communication method for a CA system, including, if a subframe n of a primary cell is an uplink subframe receiving the scheduling information UL_grant of the PUSCH information of the subframe n of the secondary cell, sent by a base station on a subframe q or a subframe y of the primary cell, where the q, determined according to the UL_grant timing relationship to which the subframe n of the primary cell corresponds, is a subframe index of a subframe that sends the scheduling information UL_grant of the PUSCH of the subframe n of the primary cell, and the y, determined according to the UL_grant timing relationship to which the subframe n of the secondary cell corresponds, is a subframe index of a subframe that sends the scheduling information UL_grant of the PUSCH of the subframe n of the secondary cell, or, when the subframe n of the primary cell is a downlink subframe, if the subframe y of the primary cell is a downlink subframe, receiving the scheduling information UL_grant of the PUSCH information of the subframe n of the secondary cell, sent by the base station on the subframe y of the primary cell; or, if the subframe y of the primary cell is an uplink subframe, according to a presetting or a notification of a base station, receiving the scheduling information UL_grant of the PUSCH of the subframe n of the secondary cell, sent by the base station on a downlink subframe in a primary cell and specified by the presetting or the notification of the base station; where, the y, determined according to the UL_grant timing relationship to which the subframe n of the secondary cell corresponds, is a subframe index of a subframe that sends the scheduling information UL_grant of the PUSCH of the subframe n of the secondary cell; where, n, q, and y are subframe indexes, and according to the scheduling information UL_grant of the PUSCH, sending the PUSCH on the subframe n of the secondary cell.

After adopting foregoing technical solutions, the communication method provided by the embodiment of the present invention for a CA system, in the CA system where each carrier has a distinct UL-DL configuration, can effectively ensure that the PUSCH of an SCell is normally scheduled and effectively ensure normal communication between the base station and the UE.

In yet another aspect, an embodiment of the present invention provides a UE for a CA system, including a receiving unit, configured to receive PDSCH information sent by a base station through a subframe n of an SCell, and a feedback unit, configured to, if the subframe n of a PCell is a downlink subframe, feed back an AN of the sent PDSCH information on a subframe m or a subframe p of the PCell, where the m, determined according to the AN timing relationship to which the subframe n of the PCell corresponds, is a subframe index of a subframe that feeds back the AN of the PDSCH of the subframe n of the PCell in a PCell, and the p, determined according to the AN timing relationship to which the subframe n of the SCell corresponds, is a subframe index of a subframe that feeds back the AN of the PDSCH of the subframe n of the SCell in a SCell, or if the subframe n of the PCell is an uplink subframe, if a subframe p of the PCell is an uplink subframe, feed back an AN of the sent PDSCH information on the subframe p of the PCell; or, if the subframe p of the PCell is a downlink subframe, according to a presetting or a notification of a base station, feed back an AN of the sent PDSCH information on an uplink subframe in a PCell and specified by the presetting or the notification of the base station, where, n, m, and p are subframe indexes.

In yet another aspect, an embodiment of the present invention provides a base station for a CA system, including a sending unit, configured to send PDSCH information to a UE through a subframe n of an SCell, and a receiving unit, configured to, if a subframe n of a PCell is a downlink subframe, receive an AN of the sent PDSCH information sent by a UE on a subframe m or a subframe p of the PCell, where the m, determined according to the AN timing relationship to which the subframe n of the PCell corresponds, is a subframe index of a subframe that feeds back the AN of the PDSCH of the subframe n of the PCell in a PCell, and the p, determined according to the AN timing relationship to which the subframe n of the SCell corresponds, is a subframe index of a subframe that feeds back the AN of the PDSCH of the subframe n of the SCell in a SCell, or if the subframe n of the PCell is an uplink subframe, if a subframe p of the PCell is an uplink subframe, receive an AN of the sent PDSCH information sent by a UE on the subframe p of the PCell; or, if the subframe p of the PCell is a downlink subframe, receive, according to a presetting or a notification of a base station, an AN of the sent PDSCH information sent by the UE on an uplink subframe in a PCell and specified by the presetting or the notification of the base station, where, n, m, and p are subframe indexes.

In yet another aspect, an embodiment of the present invention provides a method for a CA system, including, receiving physical downlink share channel (PDSCH) information sent by a base station through a subframe n of a secondary cell, and on a subframe k of a primary cell, feeding back an ACK/NACK of the sent PDSCH information, where the k, determined according to the ACK/NACK timing relationship of a first reference TDD UL-DL configuration, is a subframe index of a subframe that feeds back the ACK/NACK of the subframe n of the secondary cell in a primary cell.

In yet another aspect, an embodiment of the present invention provides a method for a CA system, including sending physical downlink share channel (PDSCH) information to a user equipment through a subframe n of a secondary cell, and on a subframe k of a primary cell, receiving an ACK/NACK of the sent PDSCH information fed back by the user equipment, where the k, determined by the user equipment according to the ACK/NACK timing relationship of a first reference TDD UL-DL configuration, is a subframe index of a subframe that feeds back the ACK/NACK of the subframe n of the secondary cell in a primary cell.

In yet another aspect, an embodiment of the present invention provides a user equipment for a CA system, including a receiving unit, configured to receive physical downlink share channel (PDSCH) information sent by a base station through a subframe n of a secondary cell, a processing unit, configured to determine, according to the ACK/NACK timing relationship of a first reference TDD UL-DL configuration, a subframe index k of subframe in a primary cell that feeds back the ACK/NACK to which the subframe n of the secondary cell corresponds, and a sending unit, configured to feed back the ACK/NACK of the PDSCH information received by the receiving unit on the subframe k determined by the processing unit in a primary cell.

In yet another aspect, an embodiment of the present invention provides a base station for a CA system, including a sending unit, configured to send physical downlink share channel (PDSCH) information to a user equipment through a subframe n of a secondary cell, and a receiving unit, configured to receive, on a subframe k of a primary cell, an ACK/NACK of the PDSCH information received by the receiving unit and fed back by the user equipment, where the k, determined by the user equipment according to the ACK/NACK timing relationship of a first reference TDD UL-DL configuration, is a subframe index of a subframe that feeds back the ACK/NACK of the subframe n of the secondary cell in a primary cell.

After adopting foregoing technical solutions, the UE and the base station provided by the embodiments of the present invention for a CA system, in the CA system where each carrier has a distinct UL-DL configuration, can effectively ensure that an uplink AN to which an SCell corresponds is normally fed back and further effectively ensure normal communication between a UE and a base station.

In still another aspect, an embodiment of the present invention provides a base station for a CA system, including a generation unit, configured to generate scheduling information UL_grant for scheduling PUSCH of an uplink subframe n of an SCell, and a scheduling unit, configured to if the subframe n of a PCell is an uplink subframe send the scheduling information UL_grant of the PUSCH of a UE through a subframe q or a subframe y of the PCell, where the q, according to the UL_grant timing relationship to which the subframe n of the PCell corresponds, is a subframe index of a subframe that sends the scheduling information UL_grant of the PUSCH of the subframe n of the PCell, and the y, according to the UL_grant timing relationship to which the subframe n of the SCell corresponds, is a subframe index of a subframe that sends the scheduling information UL_grant of the PUSCH of the subframe n of the SCell, or if the subframe n of the PCell is a downlink subframe, if the subframe y of the PCell is a downlink subframe, send the scheduling information UL_grant of the PUSCH to the UE through the subframe y of the PCell, and if the subframe y of the PCell is an uplink subframe, according to presetting or locally acquired information, send the scheduling information UL_grant of the PUSCH to the UE through a downlink subframe in a PCell and specified by the presetting or the locally acquired information, where, n, q, and y are subframe indexes.

In still another aspect, an embodiment of the present invention provides a UE for a CA system, including a receiving unit, configured to, if the subframe n of a PCell is an uplink subframe, receive the scheduling information UL_grant of the PUSCH information of the subframe n of the SCell, sent on a subframe q or a subframe y of the PCell by a base station, where the q, according to the UL_grant timing relationship to which the subframe n of the PCell corresponds, is a subframe index of a subframe that sends the scheduling information UL_grant of the PUSCH of the subframe n of the PCell, and the y, according to the UL_grant timing relationship to which the subframe n of the SCell corresponds, is a subframe index of a subframe that sends the scheduling information UL_grant of the PUSCH of the subframe n of the SCell, or if the subframe n of the PCell is a downlink subframe, if a subframe y of the PCell is a downlink subframe, receive the scheduling information UL_grant of the PUSCH information of the subframe n of the SCell, sent on the subframe y of the PCell by a base station; and if the subframe y of the PCell is an uplink subframe, according to a presetting or a notification of the base station, receive, by the base station, the scheduling information UL_grant of the PUSCH on a downlink subframe in the SCell and specified by the presetting or the notification of the base station where, n, q, and y are subframe indexes, and a sending unit, configured to send, according to the scheduling information UL_grant of the PUSCH, the PUSCH on the subframe n of the SCell.

After adopting foregoing technical solutions, the base station and the UE provided by the embodiment of the present invention for a CA system, in the CA system where each carrier has a distinct UL-DL configuration, can effectively ensure that the PUSCH of an SCell is normally scheduled and effectively ensure normal communication between the base station and the UE.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 3 is a schematic diagram of an UL-DL configuration of a CA system of an embodiment of the present invention;

FIG. 4 is another flowchart of a communication method of an embodiment of the present invention;

FIG. 16 is a schematic diagram of an UL-DL configuration of a CA system of an embodiment of the present invention;

FIG. 23 is a schematic diagram of an UL-DL configuration of a CA system of an embodiment of the present invention;

FIG. 24 is a schematic diagram of an UL-DL configuration of a CA system of an embodiment of the present invention; and FIG. 25 is a schematic diagram of an UL-DL configuration of a CA system of an embodiment of the present invention.

DETAILED DESCRIPTION OF ILLUSTRATIVE EMBODIMENTS

Figure 1:
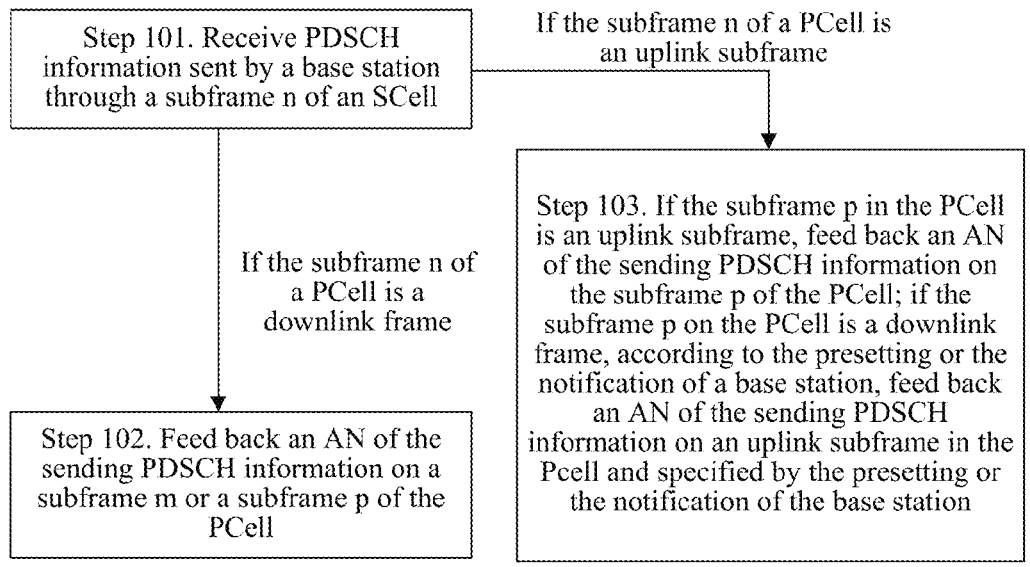
FIG. 1 is a flowchart of a communication method of an embodiment of the present invention.

The technical solutions in the embodiments of the present invention are clearly and completely described in the following with reference to the accompanying drawings in the embodiments of the present invention.

It should be definite that, the described embodiments are only a part of the embodiments of the present invention rather than all the embodiments. All other embodiments obtained by persons of ordinary skill in the art based on the embodiments of the present invention without creative efforts shall fall within the protection scope of the present invention.

It should be noted that, the embodiments of the present invention are applied to a time division duplexing TDD (Time Division Duplexing) system or a carrier aggregation system of the TDD and the frequency division duplexing FDD (Frequency Division Duplexing), and the like. Additionally, in the embodiments of the present invention, a cell (Cell) may also be replaced with the concept of a member carrier. In this way, a PCell is also called a PCC and an SCell also called an SCC.

To make persons skilled in the art better understand the technical solutions of the present invention, firstly the UL-DL configuration and the timing relationship in an LTE TDD system are briefly introduced.

A detailed UL-DL configuration of an LTE TDD system is listed in Table 1. The LTE TDD system may support seven different types of UL-DL subframe configurations from configuration 0 to configuration 6. In different UL-DL configurations, one wireless frame includes 10 subframe indexes or subframe numbers from 0 to 9. Subframes of the same subframe index may have a same or different subframe type. In Table 1, D indicates a downlink subframe, S indicates a special subframe that may transmit downlink data, and U indicates an uplink subframe.

TABLE 1

UL-DL CONFIGURATION OF AN LTE TDD SYSTEM

| UL-DL configuration | Subframe Index (Subframe Number) | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Specifically, a timing relationship between PDSCH and its corresponding uplink AN is listed in Table 2. A subframe marked with a number in Table 2 is an uplink subframe, where the number indicates the uplink AN of PDSCH of which downlink subframe needs to be fed back by the uplink subframe. For example in configuration 1, numbers 5 and 6 in a subframe 2 indicates that the uplink subframe 2 is used to feed back the uplink AN of downlink subframes 5 and 6.

TABLE 2

TIMING RELATIONSHIP BETWEEN PDSCH AND ITS CORRESPONDING UPLINK AN

| UL-DL Configuration | Subframe Index (Subframe Number) | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | | 0 | | 1 | | 5 |
| 1 | | | 5.6 | 9 | | | | 0.1 | 4 | |
| 2 | | | 4.5.6.8 | | | | | 0.1.3.9 | | |

TABLE 2-continued

TIMING RELATIONSHIP BETWEEN PDSCH AND ITS CORRESPONDING UPLINK AN

| UL-DL Configuration | 0 | 1 | 2 | 3 | 4 | 5 | 6 | 7 | 8 | 9 |
|---|---|---|---|---|---|---|---|---|---|---|
| 3 | | | 1.5.6 | 7.8 | 0.9 | | | | | |
| 4 | | | 0.1.4.5 | 6.7.8.9 | | | | | | |
| 5 | | | 0.1.3.4.5.6.7.8.9 | | | | | | | |
| 6 | | | 5 | 6 | | 9 | | 0 | 1 | |

Specifically, a timing relationship between UL_grant and PUSCH scheduled by it is listed in Table 3. A subframe marked with a number in Table 3 is an uplink subframe, where the number indicates on which one downlink subframe the UL_grant for scheduling PUSCH of the current uplink subframe is sent. For example in configuration 1, PUSCH of an uplink subframe 2 is scheduled by UL_grant sent to a downlink subframe 6, and in configuration 0, PUSCH of an uplink subframe 2 may be scheduled by the UL_grant sent to downlink subframes 5 and 6.

TABLE 3

Timing relationship between UL_grant and PUSCH that scheduled by UL_grant.

| UL-DL Configuration | 0 | 1 | 2 | 3 | 4 | 5 | 6 | 7 | 8 | 9 |
|---|---|---|---|---|---|---|---|---|---|---|
| 0 | | | 5.6 | 6 | 0 | | | 0.1 | 1 | 5 |
| 1 | | | 6 | 9 | | | | 1 | 4 | |
| 2 | | | 8 | | | | | 3 | | |
| 3 | | | 8 | 9 | 0 | | | | | |
| 4 | | | 8 | 9 | | | | | | |
| 5 | | | 8 | | | | | | | |
| 6 | | | 5 | 6 | 9 | | | 0 | 1 | |

In a CA system where a plurality of carriers has different UL-DL configurations, when an uplink AN of a UE can only be set to an uplink PCell, according to the uplink AN timing relationship of an SCell, the AN to which the SCell corresponds may be not fed back, affecting normal communication between a base station and the UE. For example, in a TDD CA system that includes two carriers: a PCell and an SCell, the PCell is an UL-DL configuration 2, and the SCell is an UL-DL configuration 1. As listed in Table 2, according to a timing relationship between PDSCH of the SCell and its corresponding uplink AN, the ANs to which the two downlink subframes 4 and 9 of the SCell correspond are respectively fed back on subframes 3 and 8, that is, fed back on the subframes 3 and 8 of the PCell. However, at this moment, the ANs to which the two downlink subframes 4 and 9 of the SCell fails to be fed back on the subframes 3 and 8 of the PCell according to the original time sequence, because subframes 3 and 8 of the PCell are downlink subframes.

In the similar way, in a TDD CA system where a plurality of carriers has different UL-DL configurations, in a cross-carrier scheduling scenario, PDCCH of each carrier is sent to the PCell, according to a timing relationship from the UL_grant of the SCell to PUSCH, PUSCH of the SCell may not be scheduled, affecting normal communication between a base station and a UE. For example, in a TDD CA system that includes two carriers: a PCell and an SCell, the PCell is an UL-DL configuration 1, and the SCell is an UL-DL configuration 2. In a cross-carrier scheduling scenario, PDCCH of each carrier is sent to the PCell. As listed in Table 3, according to a timing relationship between the UL_grant of the SCell and the PUSCH scheduled by the SCell, the UL_grant for scheduling PUSCH of the uplink subframe 2 is on the downlink subframe 8, that is, scheduling is performed on the subframe 8 of a PCell, but at this moment scheduling fails to be performed in a PCell, because the subframe 8 of the PCell is an uplink subframe.

Based on the above, the embodiments of the present invention provide a communication method and an apparatus for a CA system to effectively ensure normal communication between the base station and the UE.

As shown in FIG. 1, an embodiment of the present invention provides a communication method for a CA system, based on a UE. In the embodiment, the CA system is configured with a PCell and an SCell, where the PCell and the SCell have different UL-DL configurations, and the embodiment includes the following steps.

Step 101: Receive the PDSCH information sent by a base station through a subframe n of an SCell.

Here, n is a subframe index. Apparently, the subframe n of the SCell is a downlink subframe.

In the step, a UE receives downlink PDSCH information sent by the base station through the SCell. Thereafter, the UE feeds back an AN for the sent PDSCH to inform the base station of whether the sent PDSCH information is successfully received.

Optionally, if a subframe n of a PCell is a downlink subframe, the embodiment includes the following steps.

Step 102: Feed back an AN of the sent PDSCH information on a subframe m or a subframe p of the PCell, where the m, determined according to the AN timing relationship to which the subframe n of the PCell corresponds, is a subframe index of a subframe that feeds back the AN of the PDSCH of the subframe n of the PCell in a PCell, and the p, determined according to the AN timing relationship to which the subframe n of the SCell corresponds, is a subframe index of a subframe that feeds back the AN of the PDSCH of the subframe n of the SCell in a SCell.

In the step, preferably, the UE feeds back an AN of the sent PDSCH information on the subframe m of the PCell. Because the subframe n of the PCell is a downlink subframe, according to the timing relationship from the sent PDSCH of the subframe n of the PCell to the AN, feed back an AN of PDSCH of the subframe n of the PCell on the subframe m of the PCell, that is, the subframe m of the PCell is an uplink subframe, and therefore, the UE may feed back an AN of PDSCH of the subframe n of the SCell on the subframe m of the PCell, that is, to effectively ensure normal communication between the base station and the UE.

If, according to the AN timing relationship to which the subframe n of the SCell corresponds, an AN of PDSCH of the subframe n of the SCell is fed back on the subframe p of the SCell, and the subframe p of the PCell is also an uplink subframe, the UE may similarly feed back an AN of the PDSCH of the subframe n of the SCell through the subframe p of the PCell. Therefore, optionally, in the step, the UE may feed back an AN of the sent PDSCH information on the subframe p of the PCell.

Additionally, in another embodiment of the present invention, in the step, the UE may also select a subframe from the subframe m and the subframe p of the PCell to feed back an AN of the sent PDSCH information, and specifically, the UE, according to latency of the AN of the sent PDSCH information, selects the subframe that has the smallest latency between the subframe m and the subframe p of the PCell to feed back an AN of the sent PDSCH information.

It should be noted that, because the base station or the UE needs a period of processing time, the latency of the sent PDSCH information generally cannot be less than four subframes.

Optionally, if the subframe n of the PCell is a downlink subframe, physical downlink control channel (PDCCH) information sent by the base station through the subframe n of the primary cell is received. The PDCCH information is used to schedule the PDSCH information sent by the subframe n of the SCell.

Optionally, if the subframe n of the PCell is an uplink subframe, the embodiment includes the following step.

Step 103: If the subframe p of the PCell is an uplink subframe, feed back an AN of the sent PDSCH information on the subframe p of the PCell.

If the subframe p of the PCell is a downlink subframe, according to a presetting or a notification of the base station, an AN of the sent PDSCH information is fed back on an uplink subframe in a PCell or specified by the presetting or by the notification of the base station.

For example, the UE may, according to a presetting or a notification of the base station, feed back an AN of the sent PDSCH information on the subframe that has the smallest latency of feeding back the AN of the sent PDSCH information in a PCell.

According to the AN timing relationship to which the subframe n of the SCell corresponds, an AN of PDSCH of the subframe n of the SCell is fed back on the subframe p of the SCell, and when the subframe p of the PCell is also an uplink subframe, the UE may similarly feed back an AN of the PDSCH of the subframe n of the SCell through the subframe p of the PCell. However, if the subframe p of the PCell is a downlink subframe, according to a presetting or a notification of the base station, an AN of the sent PDSCH information is fed back on an uplink subframe preset in a PCell and specified by the presetting and the notification of the base station. Therefore, feeding back the AN of the PDSCH of the subframe n of the SCell can be normally performed, further effectively ensuring normal communication between the base station and the UE.

Additionally, it should be noted that, in the embodiment of the present invention, when the UE receives the sent PDSCH sent by the base station through the downlink subframe of the PCell, according to the original timing relationship of the PCell, the AN of the sent PDSCH is fed back.

Furthermore, because in the embodiment of the present invention, the uplink AN of the SCell is fed back on the uplink subframe of the PCell, to prevent the uplink subframe of the PCell from sending unbalanced number of ANs and ensure the test performance of ANs, the base station may perform shift processing of the subframe level for a specified carrier, and performing shifting of the subframe level for the specified carrier makes the number of fed back ANs on the uplink subframe of the PCell tends to be balanced, effectively ensuring the test performance of ANs, and the subframe configuration of the carrier after being shifted needs to be known both by the base station and the UE; therefore, the communication method of the embodiment of the present invention, before step 101, further includes learning that the base station performs shift processing of the subframe level for a wireless frame of the PCell relative to a wireless frame of the SCell; or learning that the base station performs shift processing of the subframe level for the wireless frame of the SCell relative to the wireless frame of the PCell.

Specifically, the UE may learn that the base station performs shift processing of the subframe level for the PCell or the SCell according to the notification of the base station or presetting.

The communication method provided by the embodiment of the present invention for a CA system, in the CA system where each carrier has a distinct UL-DL configuration, can effectively ensure that the AN to which the PDSCH of the SCell corresponds is normally fed back, and therefore further ensure normal communication between the base station and the UE.

Figure 2:
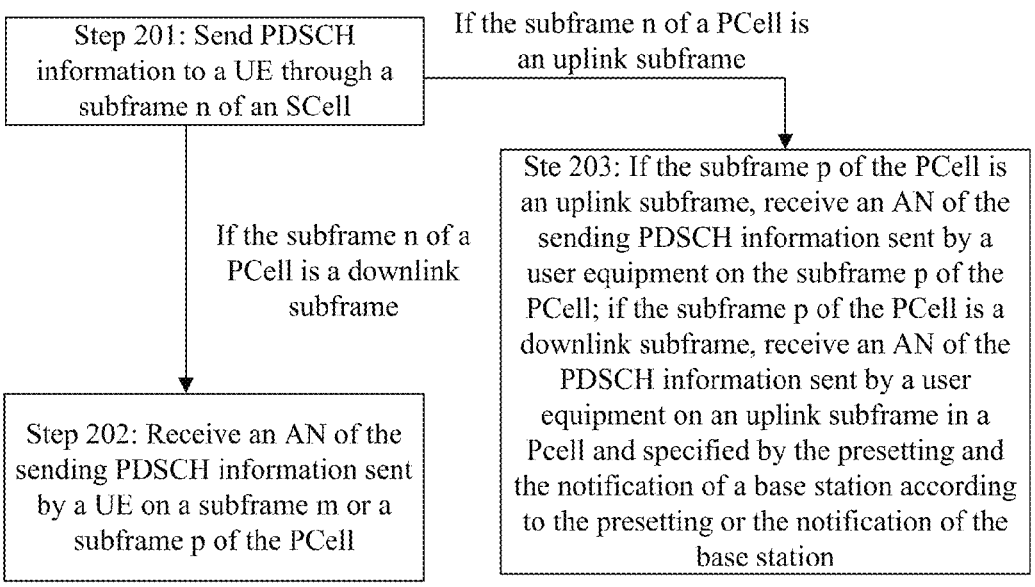
FIG. 2 is another flowchart of a communication method of an embodiment of the present invention.

Corresponding to the method in FIG. 1, an embodiment of the present invention further provides a communication method for a CA system, based on the base station serving the UE. As shown in FIG. 2, the method includes the following steps.

Step 201: Send PDSCH information to a UE through a subframe n of an SCell.

Optionally, before the sent PDSCH information to a user equipment through a subframe n of an SCell, further including: sending physical downlink control channel (PDCCH) information through the subframe n of the PCell, where the PDCCH information is used to schedule the PDSCH information sent by the subframe n of the SCell.

If the subframe n of a PCell is an uplink subframe, PDSCH on the subframe n of the secondary cell is not scheduled. Optionally, if the subframe n of the PCell is a downlink subframe, the embodiment includes the following.

Step 202: Receive an AN of the sent PDSCH information sent by a UE on a subframe m or a subframe p of the PCell, where the m, determined according to the AN timing relationship to which the subframe n of the PCell corresponds, is a subframe index of a subframe that feeds back the AN of the PDSCH of the subframe n of the PCell in a PCell, and the p, determined according to the AN timing relationship to which the subframe n of the SCell corresponds, is a subframe index of a subframe that feeds back the AN of the PDSCH of the subframe n of the SCell in a SCell.

During the normal communication process, the timing relationship of PDSCH to which the SCell corresponds are known both by the base station and the UE, that is, the base station knows the subframe of the UE that feeds back the AN of the sent PDSCH information in a PCell. Therefore, in the step, the base station adopts a receiving mode corresponding to the UE to receive the AN of the sent PDSCH information by the UE in a PCell.

Because the subframe m of the PCell is an uplink subframe, and therefore, the UE can feed back an AN of PDSCH of the subframe n of the SCell through the subframe m of the PCell, and the base station can receive the sent PDSCH information through the subframe m of the PCell. However, when the subframe p of the PCell is an uplink subframe, the UE can similarly feed back an AN of PDSCH of the subframe n of the SCell through the subframe p of the PCell, and the base station can receive the sent PDSCH information of the sent through the subframe p of the PCell. Therefore, feeding back the AN of the PDSCH of the subframe n of the SCell can be normally performed, further effectively ensuring normal communication between the base station and the UE.

Additionally, in another embodiment of the present invention, the UE is on the subframe that has the smallest latency of feeding back an AN of the PDSCH information, when feeding back the AN of the PDSCH information, the subframe is selected between the subframe m and the subframe p. In the step, the base station will receive the AN of the sent PDSCH information sent by the subframe that has the smallest latency of feeding back the AN of the sent PDSCH information and, the subframe is selected by the user equipment between the subframe m and the subframe p of the PCell.

Optionally, if the subframe n of the PCell is an uplink subframe, the embodiment includes the following steps.

Step 203: If the subframe p of the PCell is an uplink subframe, receive an AN of the sent PDSCH information sent by a user equipment on the subframe p of the PCell; if the subframe p of the PCell is a downlink subframe, receive an AN of the sent PDSCH information that is sent, according to a presetting or a notification of a base station, by the user equipment on an uplink subframe in a PCell and specified by the presetting or the notification of the base station.

Additionally, in this situation, the base station may specify which subframe of the PCell to feed back the AN of the PDSCH information for the UE. Therefore, the communication method of the embodiment, further includes sending a notification of a subframe for instructing a UE to perform AN of the PDSCH information to the UE.

Furthermore, because in the embodiment of the present invention, the uplink AN of the SCell is fed back on the uplink subframe of the PCell, to prevent the uplink subframe of the PCell from sending unbalanced number of ANs and ensure the test performance of ANs, the base station may perform shift processing of the subframe level for a specified carrier, and performing shifting of the subframe level for the specified carrier makes the number of fed back ANs on the uplink subframe of the PCell tends to be balanced, effectively ensuring the test performance of ANs, therefore, the communication method of the embodiment, before step 201, further includes performing shift processing of the subframe level for the wireless frame of the PCell relative to the wireless frame of the SCell; or performing shift processing of the subframe level for the wireless frame of the SCell relative to the wireless frame of the PCell.

The subframe configuration of the carrier after being shifted needs to be known by both the base station and the UE, and therefore, the communication method of the embodiment, after performing the shift processing, still includes sending a notification of the shift processing to a UE.

The communication method provided by the embodiment of the present invention for a CA system, in the CA system where each carrier has a distinct UL-DL configuration, can effectively ensure that the AN to which the PDSCH of the SCell corresponds is normally fed back, and therefore further ensure normal communication between the base station and the UE.

The following further details the communication method for a CA system through specific embodiments shown in FIG. 1 and FIG. 2.

As shown in FIG. 3, the CA system in the embodiment is configured with a PCell and SCell, where the PCell is an UL-DL configuration 3, and the SCell is an UL-DL configuration 2, and a subframe marked with a number is an uplink subframe, where the number indicates the uplink AN of the sent PDSCH of which downlink subframe needs to be fed back by the current uplink subframe. The embodiment takes the subframe index n=8 as an example. In view of FIG. 3, the subframe 8 of the PCell is a downlink subframe. The embodiment includes the following steps.

Step 301: Send, by a base station, PDSCH information to a UE through a subframe 8 of an SCell.

Step 302: Receive, by the UE, the PDSCH information sent by a base station through the subframe 8 of the SCell.

Step 303: Feed back, by the UE, an AN of the sent PDSCH information on a subframe 3 of a PCell.

In the step, the UE, according to the timing relationship to which the subframe 8 of the PCell corresponds, feeds back an AN of the sent PDSCH information in a PCell. In the view of FIG. 3, according to the timing relationship to which the subframe 8 of the PCell corresponds, the subframe that feeds back the AN of PDSCH of the subframe 8 of the PCell is the subframe 3 of the PCell; therefore, in the step, the UE feeds back the AN of the sent PDSCH of the subframe 8 of the SCell on the subframe 3 of the PCell.

Step 304: Receive, by the base station, AN of the sent PDSCH information sent by the UE on the subframe 3 of the PCell.

In another embodiment of the present invention, in the step, because according to the timing relationship of the SCell, the subframe of feeding back an AN of PDSCH of the subframe 8 of the SCell in a SCell is a subframe, and in a PCell, the subframe 2 is also an uplink subframe; therefore, in step 303, the UE feeds back, according to the timing relationship to which the subframe 8 of the SCell corresponds, the AN of the sent PDSCH information on the subframe 2 of the PCell. In this way, in step 304, a base station receives the AN of the sent PDSCH information sent on the subframe 2 of the PCell by the UE.

In another embodiment of the present invention, the UE may still compare the feedback latency of the foregoing subframes 2 and 3 for feeding back the AN of the sent PDSCH in a PCell in the foregoing two modes, and the feedback latency of the subframe 2 is relatively small; therefore, in step 303, the UE adopts the corresponding second mode, that is, according to the timing relationship of the SCell, the AN of the sent PDSCH information is fed back on the subframe 2 of the PCell. In step 304, the base station receives AN of the sent PDSCH information sent by the UE on the subframe 2 of the PCell.

The following similarly takes a CA system with the UL-DL configuration shown in FIG. 3 as an example to further detail the communication method for the CA system shown in FIG. 1 and FIG. 2. In the embodiment, a subframe index n=4 is taken as an example. In the view of FIG. 3, the subframe 4 of the PCell of an uplink subframe. The embodiment includes the following steps.

Step 401: Send, by a base station, PDSCH information to a UE through a subframe 4 of an SCell.

Step 402: Receive, by the UE, the PDSCH information sent by a base station through the subframe 4 of the SCell.

Step 403: Feed back, by the UE, an AN of the sent PDSCH information on a subframe 2 of a PCell.

Step 404: Receive, by a base station, AN of the sent PDSCH information sent by the UE on the subframe 2 of the PCell.

Because a subframe, on which the subframe 4 of the SCell feeds back, according to the timing relationship of the SCell, an AN of the sent PDSCH information, is the subframe 2, and in a PCell, the subframe 2 is also an uplink subframe, in the embodiment, the UE, according to the timing relationship to which the subframe 4 of the SCell corresponds, feeds back the AN of the sent PDSCH information on the subframe 2 of the PCell, and correspondingly, the base station receives the AN of the sent PDSCH information on the subframe 2 of the PCell.

The following similarly takes a CA system with the UL-DL configuration shown in FIG. 3 as an example to further detail the communication method for the CA system shown in FIG. 1 and FIG. 2. In the embodiment, a subframe index n=3 is taken as an example. In the view of FIG. 3, the subframe 3 of the PCell of an uplink subframe. The embodiment includes the following steps.

Step 501: Send, by a base station, PDSCH information to a UE through a subframe 3 of an SCell.

Step 502: Receive, by the UE, the PDSCH information sent by a base station through the subframe 3 of the SCell.

Step 503: According to a presetting, feed back, by the UE, an AN of the sent PDSCH information on the subframe in a PCell whose latency is the smallest on the subframe 3 of the SCell.

Step 504: Receive, by a base station, AN of the sent PDSCH information sent by the UE on the subframe 2 of the PCell.

Because a subframe, on which the subframe 3 of the SCell feeds back, according to the timing relationship of the SCell, AN of the PDSCH information is a subframe 7, and in a PCell, the subframe 7 is a downlink subframe and cannot perform AN feedback. Therefore, in the embodiment, the UE, according to a presetting, selects the uplink subframe 2 whose latency is the smallest relative to the subframe 3 of the SCell in a PCell to feed back an AN of the sent PDSCH information. Correspondingly, the base station receives AN of the sent PDSCH information on the subframe 2 of the PCell.

It should be noted that, in the embodiment of the present invention, after feeding back the AN to which the PDSCH of the downlink subframe n of the SCell corresponds to the uplink subframe of the PCell, the process number of the hybrid automatic retransmission request HARQ (Hybrid Automatic Repeat Request) of the SCell will be changed.

The process number change of the downlink HARQ of the SCell is taken as an example (supposing that two TDD carriers be aggregated).

If the PCell is an UL-DL configuration 2 and the SCell is an UL-DL configuration 1, according to the timing relationship between PDSCH of each carrier and the AN, the process number of the downlink HARQ of the PCell is 10, and the process number of the downlink HARQ of the SCell is 7; after adopting the technical solutions provided by the embodiment of the present invention, the process number of the downlink HARQ of the PCell is not changed, and the process number of the downlink HARQ of the SCell increases from 7 to 8.

If the PCell is an UL-DL configuration 1 and the SCell is the UL-DL configuration 2, according to the timing relationship between PDSCH of each carrier and the AN, the process number of the downlink HARQ of the PCell is 7, and the process number of the downlink HARQ of the SCell is 10; after adopting the technical solutions provided by the embodiments of the present invention, the process number of the downlink HARQ of the PCell is not changed, and the process number of the downlink HARQ of the SCell decreases from 10 to 9.

As shown in FIG. 4, an embodiment of the present invention further provides a communication method for a CA system, based on a base station. The CA system is configured with a PCell and an SCell, where the PCell and the SCell have different UL-DL configurations, and the embodiment includes the following steps.

Step 601: Generate the scheduling information UL_grant for scheduling physical uplink share channel PUSCH of an uplink subframe n of an SCell.

Here, n is a subframe index.

Optionally, if the subframe n of the PCell is an uplink subframe, the embodiment includes.

Step 602: Send the scheduling information UL_grant of the PUSCH of a UE through a subframe q or a subframe y of the PCell, where the q, according to the UL_grant timing relationship to which the subframe n of the PCell corresponds, is a subframe index of a subframe that sends the scheduling information UL_grant of the PUSCH of the subframe n of the PCell, and the y, according to the UL_grant timing relationship to which the subframe n of the SCell corresponds, is a subframe index of a subframe that sends the scheduling information UL_grant of the PUSCH of the subframe n of the SCell.

In the step, the base station preferably chooses to use the subframe q of the PCell to send the scheduling information of PUSCH to the UE. Because the subframe n of the PCell is an uplink subframe, according to the UL_grant timing relationship to which the subframe n of the PCell corresponds, send the scheduling information UL_grant of PUSCH of the subframe n of the PCell on the subframe q of the PCell, that is, the subframe q of the PCell is a downlink subframe, the base station may send the scheduling information UL_grant to the UE through the subframe q of the PCell, so as to effectively ensure normal communication between the base station and the UE.

Optionally, according to the timing relationship of the SCell, the subframe y sends UL_grant to which the subframe n of the SCell corresponds, and in a PCell, the subframe y is also a downlink subframe. The base station can similarly send the scheduling information UL_grant to the UE through the subframe y of the PCell; therefore, in the step, the base station can send the scheduling information UL_grant of the PUSCH to the UE through the subframe y of the PCell.

Additionally, in another embodiment of the present invention, in the step, the base station can also, from the subframe q and the subframe y of the PCell, select a subframe to send the scheduling information UL_grant of the PUSCH to the UE. For example, the base station, from the subframe q and the subframe y of the PCell, selects a subframe that has the smallest latency from receiving the scheduling information UL_grant of the PUSCH to sending the PUSCH by the UE and sends the scheduling information UL_grant of PUSCH to the UE.

Optionally, if the subframe n of the PCell is a downlink subframe, the embodiment includes.

Step 603: If the subframe y of the PCell is a downlink subframe, send the scheduling information UL_grant of the PUSCH to the UE through the subframe y of the PCell, and if the subframe y of the PCell is an uplink subframe, according to presetting or locally acquired information, send the scheduling information UL_grant of the PUSCH to the UE through a downlink subframe in a PCell and specified by the presetting or the locally acquired information.

The locally acquired information of the base station can be information about service status of the current system and load balancing condition acquired by the base station, and the like, according to the locally acquired information, the base station determines the subframe that sends the scheduling information UL_grant of the PUSCH in a PCell.

In the scenario where the base station sends the scheduling information UL_grant of the PUSCH according to the locally acquired information, the base station needs to send a notification to the UE so that the UE learns the subframe that sends the scheduling information UL_grant of the PUSCH in a PCell.

The communication method provided by the embodiment of the present invention for a CA system, in the CA system where each carrier has a distinct UL-DL configuration, can effectively ensure that PUSCH of the SCell is normally scheduled, and effectively ensure normal communication between the base station and the UE.

Figures 5, 6, 7:
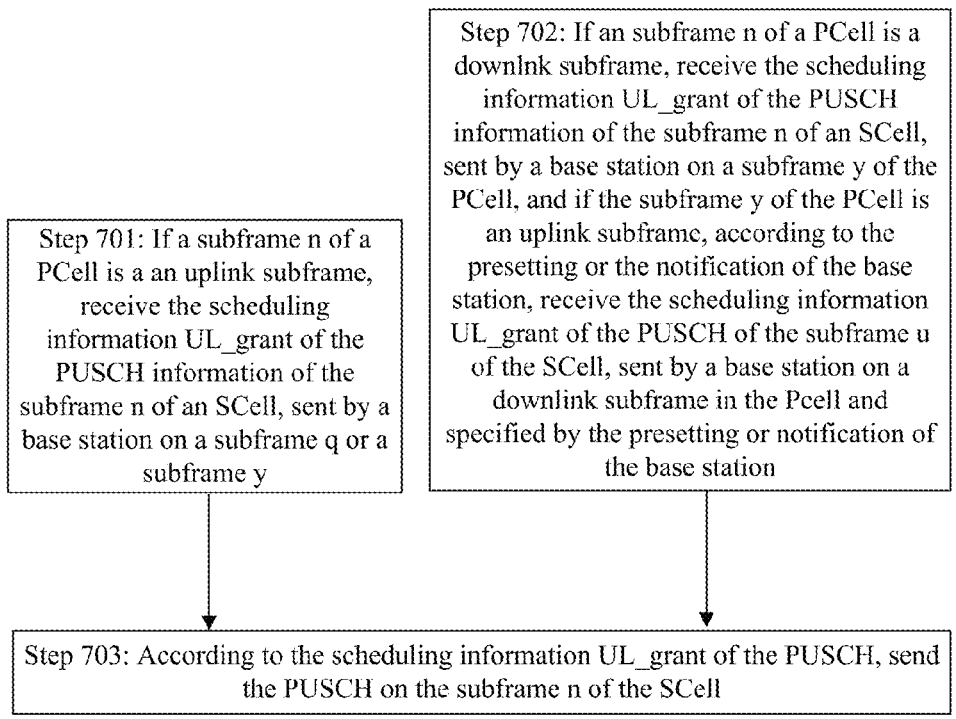
FIG. 5 is another flowchart of a communication method of an embodiment of the present invention.
FIG. 6 is a schematic diagram of an UL-DL configuration of a CA system of an embodiment of the present invention.
FIG. 7 is a schematic diagram of an UL-DL configuration of a CA system of an embodiment of the present invention.

Corresponding to the method in FIG. 4, an embodiment of the present invention further provides a communication method for a CA system, based on the UE serving the base station, as shown in FIG. 5.

If the subframe n of the PCell is an uplink subframe, optionally, the embodiment includes the following steps.

Step 701: Receive the scheduling information UL_grant of the PUSCH information of the subframe n of the SCell, sent on a subframe q or a subframe y of the PCell by a base station, where the q, according to the UL_grant timing relationship to which the subframe n of the PCell corresponds, is a subframe index of a subframe that sends the scheduling information UL_grant of the PUSCH of the subframe n of the PCell, and the y, according to the UL_grant timing relationship to which the subframe n of the SCell corresponds, is a subframe index of a subframe that sends the scheduling information UL_grant of the PUSCH of the subframe n of the SCell.

During the normal communication process, the timing relationship of the PUSCH to which the SCell corresponds should be known by both the base station and the UE, that is, the UE knows that subframe that sends the scheduling information UL_grant of the PUSCH in a PCell; and therefore, in the step, the UE adopts a receiving mode corresponding to the base station side to receive the scheduling information UL_grant for scheduling the PUSCH of the uplink subframe n of the SCell.

Because the subframe q of the PCell is a downlink subframe, the base station can send the scheduling information UL_grant for scheduling PUSCH of the uplink subframe n of the SCell through the subframe q of the PCell. When the subframe y of the PCell is a downlink subframe, the base station can similarly send the scheduling information UL_grant for scheduling PUSCH of the uplink subframe n of the SCell through the subframe y of the PCell, and the UE can receive the scheduling information UL_grant through the subframe y of the PCell to effectively ensure that the AN of PDSCH of the subframe n of the SCell is normally fed back and ensure normal communication between the base station and the UE.

Additionally, in yet another embodiment of the present invention, if a base station, in a subframe q and a subframe y, in a subframe q and a subframe y, in a subframe q and a subframe y of the PCell, selects a subframe that has the smallest latency from receiving the scheduling information UL_grant of the PUSCH to sending the PUSCH by the UE, sends the scheduling information UL_grant of the PUSCH to the UE. In the step, the UE receives the scheduling information UL_grant of the PUSCH information of the subframe n of the SCell, sent by the subframe that has the smallest latency from receiving the scheduling information UL_grant of the PUSCH to sending the PUSCH by the UE and is selected in the subframe q and the subframe y of the PCell by the base station.

If the subframe n of the PCell is a downlink subframe, optionally, the embodiment includes the following steps.

Step 702: If the subframe y of the PCell is a downlink subframe, receive the scheduling information UL_grant of the PUSCH information of the subframe n of the SCell, sent on the subframe y of the PCell by a base station, and if the subframe y of the PCell is an uplink subframe, according to a presetting or a notification of the base station, receive the scheduling information UL_grant of the PUSCH of the subframe n of the SCell, sent, by the base station, on a downlink subframe in a PCell and specified by the presetting and the notification of the base station.

Step 703: According to the scheduling information UL_grant of the PUSCH, send the PUSCH on the subframe n of the SCell.

A communication method provided by the embodiment of the present invention for a CA system, in the CA system where each carrier has a distinct UL-DL configuration, can effectively ensure that PUSCH of the SCell is normally scheduled, and effectively ensure normal communication between the base station and the UE.

The following further details the communication method for a CA system through specific embodiments shown in FIG. 4 and FIG. 5. As shown in FIG. 6, the CA system in the embodiment is configured with a PCell and an SCell, where the PCell is an UL-DL configuration 1, and the SCell is an UL-DL configuration 2, and a subframe marked with a number is an uplink subframe, where the number indicates on which downlink subframe the UL_grant for scheduling the PUSCH of the current uplink subframe is sent. The embodiment takes the subframe index n=2 as an example. In view of FIG. 6, the subframe 2 of the PCell is an uplink subframe, and the subframe 2 of the SCell is an uplink subframe. The embodiment includes the following steps.

Step 801: Generate, by a base station, the scheduling information UL_grant for scheduling physical uplink share channel PUSCH of an uplink subframe 2 of an SCell.

Step 802: Send, by the base station, the scheduling information UL_grant of PUSCH of the uplink subframe 2 of the SCell to a UE through a subframe 6 of a PCell.

Step 803: Receive, by the UE, the scheduling information UL_grant for scheduling the PUSCH of the uplink subframe 2 of the SCell, sent by the base station through the subframe 6 of the PCell.

Step 804: According to the scheduling information UL_grant of the PUSCH, send, by the UE, the PUSCH on the subframe 2 of the SCell.

In the embodiment, the subframe 2 of the PCell is an uplink subframe. As shown in FIG. 6, according to the timing relationship to which the subframe 2 of the PCell corresponds, the UL_grant to which the subframe 2 of the PCell corresponds is sent on the subframe 6 of the PCell. Therefore, in the embodiment, the base station sends the scheduling information UL_grant of PUSCH of the uplink subframe 2 of the SCell to the UE through the subframe 6 of the PCell.

The following further details the communication method for a CA system through specific embodiments shown in FIG. 4 and FIG. 5. As shown in FIG. 7, the CA system in the embodiment is configured with a PCell and an SCell, where the PCell is an UL-DL configuration 5, and the SCell is an UL-DL configuration 2, and a subframe marked with a number is an uplink subframe, where the number indicates on which downlink subframe the UL_grant for scheduling the PUSCH of the current uplink subframe is sent. The embodiment takes the subframe index n=7 as an example. In view of FIG. 7, the subframe 7 of the PCell is an uplink subframe, and the subframe 7 of the SCell is an uplink subframe. The embodiment includes the following steps.

Step 901: Generate, by a base station, the scheduling information UL_grant for scheduling physical uplink share channel PUSCH of an uplink subframe 7 of an SCell;

Step 902: Send, by the base station, the scheduling information UL_grant of PUSCH of the uplink subframe 7 of the SCell to a UE through a subframe 3 of a PCell.

Step 903: Receive, by the UE, the scheduling information UL_grant for scheduling the PUSCH of the uplink subframe 7 of the SCell, sent by the base station through the subframe 3 of the PCell.

Step 904: According to the scheduling information UL_grant of the PUSCH, sends, by the UE, the PUSCH on the subframe 7 of the SCell.

In the embodiment, the subframe 7 of the PCell is an uplink subframe. As shown in FIG. 7, according to the timing relationship to which the subframe 7 of the SCell corresponds, the UL_grant to which the subframe 7 of the SCell corresponds is sent on the subframe 3 of the SCell. Therefore, the base station sends the scheduling information UL_grant of PUSCH of the uplink subframe 7 of the SCell to the UE through the subframe 3 of the PCell.

It should be noted that, in the embodiment, after the UL_grant of the PUSCH of the uplink subframe n of the SCell is sent to the downlink subframe of the PCell, the process number of the uplink HARQ of the SCell will change.

Figure 8:
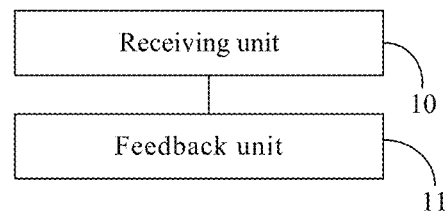
FIG. 8 is a structural diagram of a UE of an embodiment of the present invention.
Figure 9:
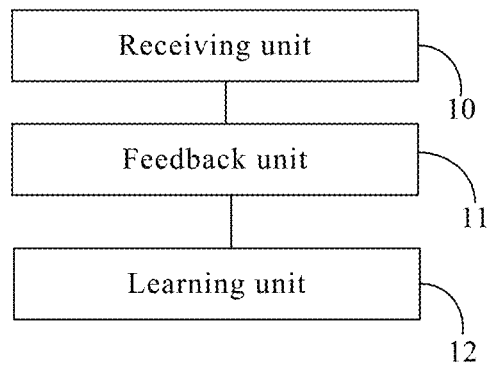
FIG. 9 is another structural diagram of a UE of an embodiment of the present invention.

Corresponding to the communication method shown in FIG. 1, an embodiment of the present invention further provides a UE for a CA system, where the CA system is configured with an SCell and a PCell, as shown in FIG. 8, includes a receiving unit, configured to receive PDSCH information sent by a base station through a subframe n of an SCell, and a feedback unit 11, configured to, if the subframe n of a PCell is a downlink subframe, feed back an ACK/NACK of the sent PDSCH information on a subframe m or a subframe p of the primary cell PCell, where the m, determined according to the ACK/NACK timing relationship to which the subframe n of the primary cell PCell corresponds, is a subframe index of a subframe that feeds back the ACK/NACK of the PDSCH of the subframe n of the primary cell PCell in a primary cell PCell, and the p, determined according to the ACK/NACK timing relationship to which the subframe n of the SCell SCell corresponds, is a subframe index of a subframe that feeds back the ACK/NACK of the PDSCH of the subframe n of the SCell SCell in a SCell SCell, or if the subframe n of the PCell is an uplink subframe, if the subframe p of the primary cell PCell is an uplink subframe, feed back the ACK/NACK of the sent PDSCH information on the subframe p of the primary cell PCell; if the subframe p of the primary cell PCell is a downlink subframe, according to a presetting or a notification of the base station, feed back the ACK/NACK of the PDSCH information on the uplink subframe in a primary cell PCell and specified by the presetting and the notification of the base station, and for example, feed back an AN of the sent PDSCH information on an uplink subframe that has the smallest latency of feeding back the AN of the sent PDSCH information in a PCell, where, n, m, and p are subframe indexes.

The UE provided by the embodiment of the present invention for a CA system, in the CA system where each carrier has a distinct UL-DL configuration, can effectively ensure that the uplink AN to which the SCell corresponds is normally fed back, and therefore effectively ensure normal communication between the base station and the UE.

Optionally, the feedback unit 11 may still be configured to, when the subframe n of the PCell is a downlink subframe, select a subframe that has the smallest latency of feeding back the AN of the PDSCH information between the subframe m and the subframe p of the PCell to feed back the AN of the sent PDSCH information.

Furthermore, because the uplink AN of the SCell is fed back on the uplink subframe of the PCell, to prevent the uplink subframe of the PCell from sending unbalanced number of ANs and ensure the test performance of ANs, the base station may perform shift processing of the subframe level for a specified carrier, and performing shifting of the subframe level for the specified carrier makes the number of fed back ANs on the uplink subframe of the PCell tends to be balanced, effectively ensuring the test performance of ANs, and the subframe configuration of the carrier after being shifted needs to be known both by the base station and the UE; therefore, the UE of the embodiment of the present invention, as shown in 9, further includes a learning unit 12, configured to learn shift processing of the subframe level for a wireless frame of the PCell relative to a wireless frame of the SCell; or learn shift processing of the subframe level for the wireless frame of the SCell relative to the wireless frame of the PCell.

Specifically, the learning unit 12 may learn that the base station performs shift processing of the subframe level for the PCell or the SCell through the notification of the base station or presetting.

Optionally, the receiving unit 10 is further configured to receive physical downlink control channel (PDCCH) information sent by the base station through the subframe n of the PCell, where the PDCCH information is used to schedule the PDSCH information sent by the base station through the subframe n of the SCell.

Figure 10:
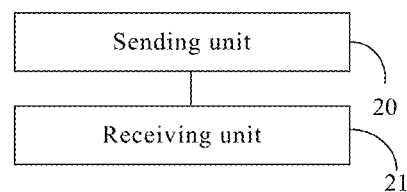
FIG. 10 is a structural diagram of a base station of an embodiment of the present invention.
Figure 11:
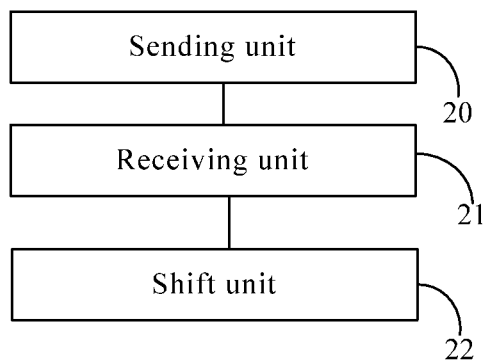
FIG. 11 is another structural diagram of a base station of an embodiment of the present invention.

Corresponding to the communication method shown in FIG. 2, an embodiment of the present invention further provides a base station for a CA system, where the CA system is configured with an SCell and a PCell, as shown in FIG. 10, includes a sending unit 20, configured to send PDSCH information to a UE through a subframe n of an SCell, and a receiving unit 21, configured to, if the subframe n of a PCell is a downlink subframe, feed back an ACK/NACK of the sent PDSCH information on a subframe m or a subframe p of the PCell, where the m, determined according to the ACK/NACK timing relationship to which the subframe n of the PCell corresponds, is a subframe index of a subframe that feeds back the ACK/NACK of the PDSCH of the subframe n of the PCell in a PCell, and the p, determined according to the ACK/NACK timing relationship to which the subframe n of the SCell corresponds, is a subframe index of a subframe that feeds back the ACK/NACK of the PDSCH of the subframe n of the SCell in a SCell, or if the subframe n of the PCell is an uplink subframe, if the subframe p of the PCell is an uplink subframe, receive an ACK/NACK of the sent PDSCH information sent by a UE on the subframe p of the PCell, and if the subframe p of the PCell is a downlink subframe, receive an ACK/NACK of the sent PDSCH information sent by the UE according to a presetting or a notification of the base station on the uplink subframe in a PCell specified by the presetting and the notification of the base station, where, n, m, and p are subframe indexes.

The UE provided by the embodiment of the present invention for a CA system, in the CA system where each carrier has a distinct UL-DL configuration, can effectively ensure that the uplink AN to which the SCell corresponds is normally fed back, and therefore effectively ensure normal communication between the base station and the UE.

Optionally, a receiving unit 21 may still be configured to, when the subframe n of the PCell is a downlink subframe, receive the AN of the sent PDSCH information sent by the UE on the subframe m or the subframe n of the PCell that has the smallest latency of feeding back the AN of the sent PDSCH information.

Furthermore, because the uplink AN of the SCell is fed back on the uplink subframe of the PCell, to prevent the uplink subframe of the PCell from sending unbalanced number of ANs and ensure the test performance of ANs, the base station may perform shift processing of the subframe level for a specified carrier, and performing shifting of the subframe level for the specified carrier makes the number of fed back ANs on the uplink subframe of the PCell tends to be balanced, and therefore, the base station provided by the embodiment of the present invention, as shown in FIG. 1, further includes a shift unit 22, configured to perform shift processing of the subframe level for a wireless frame of the PCell relative to a wireless frame of the SCell; or perform shift processing of the subframe level for the wireless frame of the SCell relative to the wireless frame of the PCell.

Furthermore, to make the subframe configuration of the carrier after being shifted known by both the base station and the UE, the sending unit 20 may also send a notification to the UE about the shift processing.

Optionally, the sending unit 20 is further configured to send physical downlink control channel (PDCCH) information through the subframe n of the PCell, where the PDCCH information is used to schedule the PDSCH information sent through the subframe n of the SCell.

Optionally, the receiving unit 20, if the subframe n of the PCell is an uplink subframe, does not schedule the PDSCH of the subframe n of the SCell.

Figure 12:
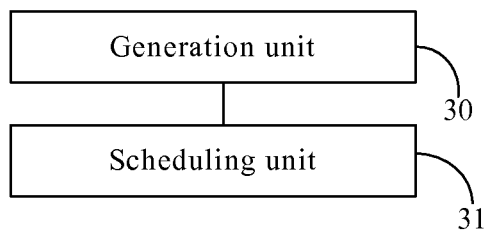
FIG. 12 is a structural diagram of a base station of an embodiment of the present invention.

Corresponding to the communication method shown in FIG. 4, an embodiment of the present invention further provides a base station for a CA system, where the CA system is configured with an SCell and a PCell, as shown in FIG. 12, includes a generation unit 30, configured to generate scheduling information UL_grant for scheduling PUSCH of an uplink subframe n of an SCell, and a scheduling unit 31, configured to, if the subframe n of the PCell is an uplink subframe, send the scheduling information UL_grant of the PUSCH to a UE through a subframe q or a subframe y of the PCell, where the q, according to the UL_grant timing relationship to which the subframe n of the PCell corresponds, is a subframe index of a subframe that sends the scheduling information UL_grant of the PUSCH of the subframe n of the PCell, and the y, according to the UL_grant timing relationship to which the subframe n of the SCell corresponds, is a subframe index of a subframe that sends the scheduling information UL_grant of the PUSCH of the subframe n of the SCell, or if the subframe n of the PCell is a downlink subframe, if the subframe y of the PCell is a downlink subframe, send the scheduling information UL_grant of the PUSCH to the UE through the subframe q of the PCell, and if the subframe y of the PCell is an uplink subframe, according to presetting or locally acquired information, send the scheduling information UL_grant of the PUSCH to the UE through a downlink subframe in a PCell and specified by the presetting and the locally acquired information, where, n, q, and y are subframe indexes.

The base station provided by the embodiment for a CA system, in the CA system where each carrier has a distinct UL-DL configuration, can effectively ensure that PUSCH of the SCell is normally scheduled, and effectively ensure normal communication between the base station and the UE.

Optionally, when the subframe n of the PCell is an uplink subframe, the scheduling unit 31 can still be configured to, between the subframe q and the subframe y of the PCell, select a subframe that has the smallest latency from receiving the scheduling information UL_grant of the PUSCH to sending the PUSCH by the UE and send the scheduling information UL_grant of PUSCH to the UE.

Figure 13:
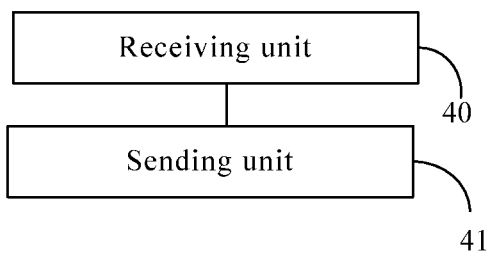
FIG. 13 is a structural diagram of a UE of an embodiment of the present invention.

Corresponding to the communication method shown in FIG. 5, an embodiment of the present invention further provides a UE for a CA system, where the CA system is configured with an SCell and a PCell, as shown in FIG. 13, includes a receiving unit 40, configured to if the subframe n of the PCell is an uplink subframe receive the scheduling information UL_grant of the PUSCH information of the subframe n of the SCell, sent on a subframe q or a subframe y of the PCell by a base station, where the q, according to the UL_grant timing relationship to which the subframe n of the PCell corresponds, is a subframe index of a subframe that sends the scheduling information UL_grant of the PUSCH of the subframe n of the PCell, and the y, according to the UL_grant timing relationship to which the subframe n of the SCell corresponds, is a subframe index of a subframe that sends the scheduling information UL_grant of the PUSCH of the subframe n of the SCell, or if the subframe n of the PCell is a downlink subframe, if the subframe y of the PCell is a downlink subframe, receive the scheduling information UL_grant of the PUSCH information of the subframe n of the SCell, sent on the subframe y of the PCell by a base station, and if the subframe y of the PCell is an uplink subframe, according to a presetting or a notification of the base station, receive the scheduling information UL_grant of the PUSCH of the subframe n of the SCell, sent, by the base station, on a downlink subframe in a PCell and specified by the presetting and the notification of the base station, where, n, q, and y are subframe indexes; and a sending unit 41, configured to send, according to the scheduling information UL_grant of the PUSCH, the PUSCH on the subframe n of the SCell.

The UE provided by the embodiment for a CA system, in the CA system where each carrier has a distinct UL-DL configuration, can effectively ensure that PUSCH of the SCell is normally scheduled, and effectively ensure normal communication between the base station and the UE.

Optionally, the receiving unit 40 may still be configured to receive the scheduling information UL_grant of the PUSCH information of the subframe n of the SCell, sent by the subframe that has the smallest latency from receiving the scheduling information UL_grant of the PUSCH to sending the PUSCH by the UE and is selected in the subframe q and the subframe y of the PCell by the base station.

Figure 14:
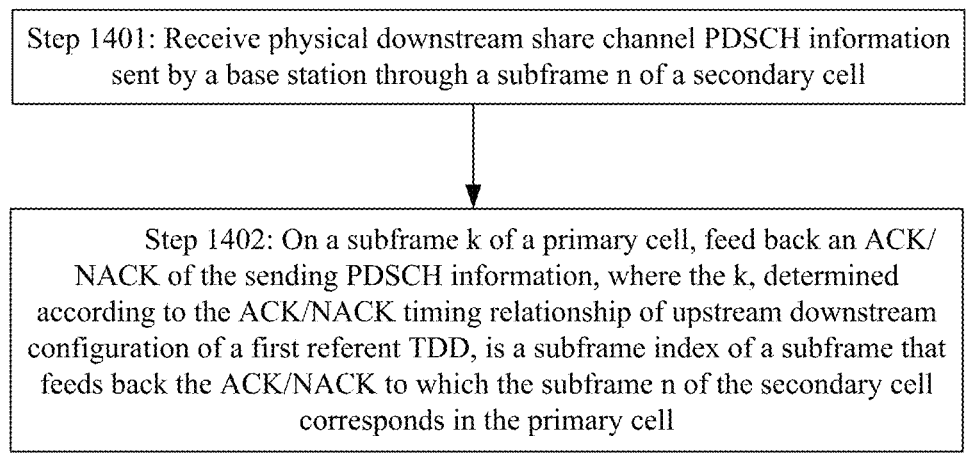
FIG. 14 is another flowchart of a communication method of an embodiment of the present invention.

An embodiment of the present invention provides a communication method for a CA system, based on a UE. As shown in FIG. 14, the embodiment includes the following steps.

Step 1401: Receive physical downlink share channel PDSCH information sent by a base station through a subframe n of a secondary cell.

Step 1402: On a subframe k of a primary cell, feed back an ACK/NACK of the sent PDSCH information, where the k, determined according to the ACK/NACK timing relationship of a first reference TDD UL-DL configuration, is a subframe index of a subframe that feeds back the ACK/NACK of the subframe n of the secondary cell in a primary cell.

Optionally, the first reference TDD UL-DL configuration is the TDD UL-DL configuration of the primary cell; or, the first reference TDD UL-DL configuration is a TDD UL-DL configuration 5.

Figure 15:
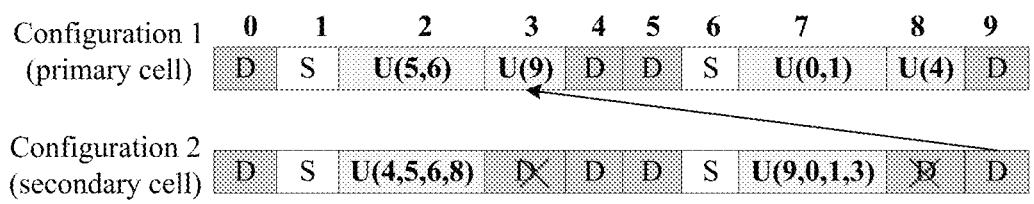
FIG. 15 is a schematic diagram of an UL-DL configuration of a CA system of an embodiment of the present invention.

For example, as shown in FIG. 15, it is assumed that the primary cell is a TDD UL-DL configuration 1, the secondary cell is a TDD UL-DL configuration 2, both cells are aggregated to one UE for data transmission, and it is assumed that the PDSCH to which the PDCCH of the secondary cell corresponds is sent to the primary cell, that is, in a cross-carrier scheduling scenario, and it is assumed that the uplink ACK/NACK must be fed back in a primary cell. In this way, when the subframe n of the secondary cell is a downlink 0, 1, 4, 5, 6, or 9, the subframe n of the corresponding primary cell is also a downlink subframe, where the subframe n of the primary cell may be used to schedule PDSCH of the subframe n of the secondary cell by crossing the carrier, and the feedback timing of the ACK/NACK to which the PDSCH corresponds may be set according to the timing relationship of the primary cell, that is, the first reference TDD UL-DL configuration is the TDD UL-DL configuration of the primary cell. Specifically, the ACK/NACK to which the PDSCH of the subframes 5 and 6 of the secondary cell corresponds is on the subframe 2 of the primary cell, and the ACK/NACK feedback to which the PDSCH of the subframe 8 of the secondary cell is on the subframe 3 of the primary cell, and the like. It further includes that the first reference TDD UL-DL configuration is the TDD UL-DL configuration 5, that is, configuration of nine downlink subframes and one uplink subframes. For the primary cell whose subframe ns are downlink subframes 3 and 8, while subframe ns of the corresponding primary cell is uplink subframes, the base station does not schedule the PDSCH of the UE on the subframes; therefore, the UE may assume that the base station does not schedule the PDSCH of subframes 3 and 8.

Optionally, if a primary cell and a secondary cell have different TDD UL-DL configurations and the following conditions exist: for a first subframe, the subframe of the primary cell is an uplink subframe while that of the secondary cell is a downlink subframe; for a second subframe, the subframe of the primary cell is a downlink subframe while that of the secondary cell is an uplink subframe (vice versa), the uplink ACK/NACK of the secondary cell fails to be fed back according to the timing of the primary cell or the secondary cell, and the ACK/NACK may be fed back by the secondary cell according to the uplink ACK/NACK timing of the TDD UL-DL configuration 5. For example, the primary cell is configuration 2 and the secondary cell is configuration 3, or the primary cell is configuration 2 and the secondary cell is configuration 4, still or the primary cell is configuration 1 and the secondary cell is configuration 3.

In the technical method, the resources of ACK/NACK are easily allocated, because if the secondary cell feeds back the ACK/NACK in a primary cell according to its own timing relationship, there may be ACK/NACK resource conflict, for example, if the ACK/NACK to which the subframe 9 of the secondary cell corresponds is fed back to the subframe 7 of the primary cell according to its own timing relationship, the base station is required to resolve the conflict because the subframe 7 of the primary cell does not reserve implicit ACK/NACK resources for the subframe 9; conversely, if the ACK/NACK to which subframe 9 of the secondary cell corresponds is fed back on the subframe 3 of the primary cell according to the timing relationship of the primary cell, the base station will not be scheduled to resolve the ACK/NACK resource conflict because the subframe 3 of the primary cell reserves implicit ACK/NACK resources for the subframe 9. Furthermore, the ACK/NACK feedback latency is shortened, such as the latency of feeding back ACK/NACK to which the subframe 9 corresponds to the subframe 3 is 4, while the latency of feeding back the ACK/NACK to the subframe 7 is 8. 3) For subframes 3 and 8 of the secondary cell, the policy of not scheduling by the base station is adopted, which can be easily implemented, and the secondary cell may feed back the uplink ACK/NACK according to a complete suite of timing relationship of the primary cell.

Optionally, the first reference TDD UL-DL configuration uses a public uplink subframe set or a public uplink subframe subset of the same time in a primary cell and the secondary cell as uplink subframes, and other subframes are the TDD UL-DL configuration of the downlink subframe.

For example, as shown in FIG. 16, it is assumed that the primary cell is a TDD UL-DL configuration 1, and the secondary cell is a TDD UL-DL configuration 3, where the two cells are aggregated to one UE for data transmission, and it is assumed that the uplink ACK/NACK must be fed back in a primary cell. Because the subframe 4 is a downlink subframe for the primary cell and an uplink subframe for the secondary cell; conversely, the subframes 7 and 8 are uplink subframes for the primary cell and downlink subframes for the secondary cell; therefore, the uplink ACK/NACK of the primary cell may be set according to its own timing, but the uplink ACK/NACK timing of the secondary cell can be set completely according neither to the timing of the secondary cell nor to the timing of the primary cell. In this situation, the ACK/NACK timing of the secondary cell may be set according to the first reference timing, and the first reference timing may use public uplink subframes of the same time in a primary and the secondary cell as a uplink subframe, and other subframes are the timing relationship of the uplink ACK/NACK of TDD UL-DL configuration of the downlink subframes, for example, the reference configuration 1 in FIG. b is configuration 4, that is, the public uplink subframes of the same time in a primary cell and the secondary cell are uplink subframes 2 and 3, and other subframes are downlink subframes; or the first reference timing may use the subset of a public uplink subframe set of the same time in a primary cell and the secondary cell as a uplink subframe, and other eight subframes are the timing relationship of the uplink ACK/NACK of the TDD UL-DL configuration of the downlink subframe, for example, the reference configuration 2 in FIG. b is configuration 5, that is, the public uplink subframe set of the same time in a primary cell and the secondary cell includes uplink subframes 2 and 3, one subframe of which may be an uplink subframe 2, and other nine subframes are all downlink subframes. The solution may make the secondary cell feed back the uplink ACK/NACK according to a complete suite of reference configuration.

Optionally, if the downlink subframe of the secondary cell corresponds to at least two types of the first reference TDD UL-DL configurations, further including: determining the first reference TDD UL-DL configuration to which the subframe n of the secondary cell corresponds from the at least two types of the first reference TDD UL-DL configurations; the k, determined according to the ACK/NACK timing relationship of the first reference TDD UL-DL configuration to which the subframe n of the secondary cell corresponds, is a subframe index of a subframe that feeds back the ACK/NACK to which the subframe n of the secondary cell corresponds in a primary cell.

Figure 17:
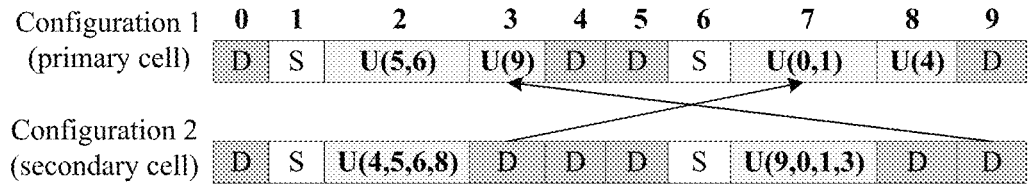
FIG. 17 is a schematic diagram of an UL-DL configuration of a CA system of an embodiment of the present invention.

For example, as shown in FIG. 17, the primary cell is the TDD UL-DL configuration 1, and the secondary cell is the TDD UL-DL configuration 2, where the two cells are aggregated to one UE for data transmission, and the uplink ACK/NACK must be fed back in a primary cell. In this way, downlink subframes 4 and 9 of the secondary cell may form a first group, and the remaining downlink subframes form a second group. The uplink ACK/NACK of the first group subframe may be fed back according to the first type of ACK/NACK timing relationship of the first reference TDD UL-DL configuration, for example, the first type of the first reference TDD UL-DL configuration is the configuration of the primary cell or other configurations; the uplink ACK/NACK of the second group subframe may be fed back according to the second type of ACK/NACK timing relationship of the first reference TDD UL-DL configuration, for example, the second type of the first reference TDD UL-DL configuration is the configuration of the secondary cell or other configurations. The solution shortens the latency of ACK/NACK feedback to which certain downlink subframes of the secondary cell.

Optionally, if the subframe n of the primary cell is a downlink subframe, further including: receiving PDCCH sent by the base station on the subframe n of the primary cell, where the PDCCH is used to schedule the PDSCH of the subframe n of the secondary cell.

Figure 18:
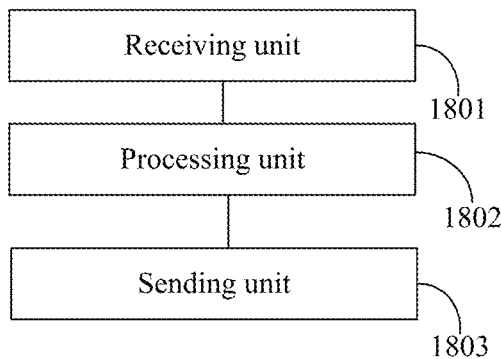
FIG. 18 is another structural diagram of a UE of an embodiment of the present invention.

An embodiment of the present invention provides a user equipment for performing the foregoing method. As shown in FIG. 18, the user equipment includes a receiving unit 1801, configured to receive physical downlink share channel PDSCH information sent by a base station through a subframe n of a secondary cell, a processing unit 1802, configured for a subframe k, determined according to the ACK/NACK timing relationship of a first reference TDD UL-DL configuration, is a subframe index of a subframe that feeds back the ACK/NACK to which the subframe n of the secondary cell corresponds in a primary cell, and a sending unit 1803, configured to feed back the ACK/NACK of the PDSCH information received by the receiving unit 1801 on the subframe k determined by the processing unit 1801 in a primary cell.

Optionally, the first reference TDD UL-DL configuration is the TDD UL-DL configuration of the primary cell; or, the first reference TDD UL-DL configuration is a TDD UL-DL configuration 5.

Optionally, the first reference TDD UL-DL configuration uses a public uplink subframe set or a public uplink subframe subset of the same time in a primary cell and the secondary cell as uplink subframes, and other subframes are the TDD UL-DL configuration of the downlink subframe.

Optionally, if the downlink subframe of the secondary cell corresponds to at least two types of the first reference TDD UL-DL configurations, the processing unit is further configured to determine the first reference TDD UL-DL configuration to which the subframe n of the secondary cell corresponds from the at least two types of the first reference TDD UL-DL configurations; specifically configured for the k, determined according to the ACK/NACK timing relationship of the first reference TDD UL-DL configuration to which the subframe n of the secondary cell corresponds, is a subframe index of a subframe that feeds back the ACK/NACK to which the subframe n of the secondary cell corresponds in a primary cell.

Optionally, if the subframe n of the primary cell is a downlink subframe, the receiving unit is further configured to receive PDCCH sent by the base station on the subframe n of the primary cell, where the PDCCH is used to schedule the PDSCH of the subframe n of the secondary cell.

For the effects of the user equipment, reference may be made to description of embodiments.

Figure 19:
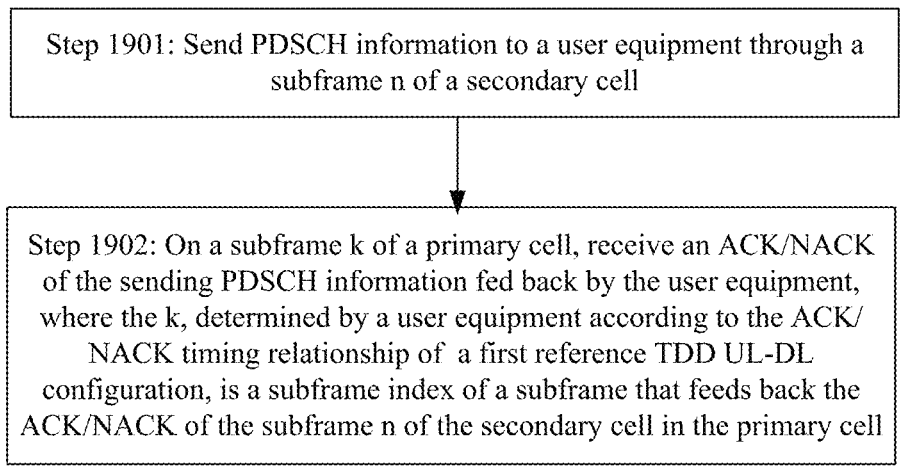
FIG. 19 is another flowchart of a communication method of an embodiment of the present invention.

An embodiment of the present invention provides a communication method for a CA system, based on a UE. As shown in FIG. 19, the embodiment includes the following steps.

Step 1901: Send physical downlink share channel PDSCH information to a user equipment through a subframe n of a secondary cell.

Step 1902: On a subframe k of a primary cell, receive an ACK/NACK of the sent PDSCH information fed back by the user equipment, where the k, determined by the user equipment according to the ACK/NACK timing relationship of a first reference TDD UL-DL configuration, is a subframe index of a subframe that feeds back the ACK/NACK of the subframe n of the secondary cell in a primary cell.

Optionally, the first reference TDD UL-DL configuration is the TDD UL-DL configuration of the primary cell, or, the first reference TDD UL-DL configuration is a TDD UL-DL configuration 5.

Optionally, the first reference TDD UL-DL configuration uses a public uplink subframe set or a public uplink subframe subset of the same time in a primary cell and the secondary cell as uplink subframes, and other subframes are the TDD UL-DL configuration of the downlink subframe.

Optionally, if the downlink subframe of the secondary cell corresponds to at least two types of the first reference TDD UL-DL configurations, the k, determined according to the first reference TDD UL-DL configuration that the subframe n of the secondary cell corresponds to and is determined by the user equipment from the at least two types of the first reference TDD UL-DL configurations, is a subframe index of a subframe that feeds back the subframe n of the secondary cell in a primary cell.

Optionally, where if the subframe n of the primary cell is a downlink subframe, further including: receiving PDCCH sent by the base station on the subframe n of the primary cell, where the PDCCH is used to schedule the PDSCH of the subframe n of the secondary cell.

Optionally, if the subframe n of the primary cell is an uplink subframe, PDSCH of the subframe n of the secondary cell is not scheduled.

For the effects of the solution, reference may be made to FIG. 14.

Figure 20:
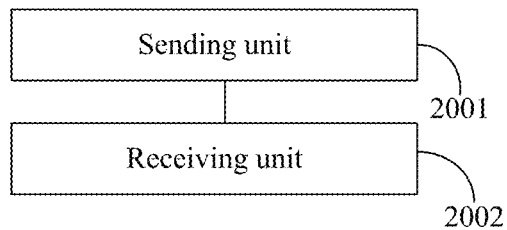
FIG. 20 is another structural diagram of a base station of an embodiment of the present invention.

An embodiment of the present invention provides a base station for performing the foregoing method. As shown in FIG. 20, the base station includes a sending unit 2001, configured to send physical downlink share channel PDSCH information to a user equipment through a subframe n of a secondary cell, and a receiving unit 2002, configured to receive, on a subframe k of a primary cell, an ACK/NACK of the PDSCH information received by the receiving unit 2001 and fed back by the user equipment, where the k, determined by the user equipment according to the ACK/NACK timing relationship of a first reference TDD UL-DL configuration, is a subframe index of a subframe that feeds back the ACK/NACK of the subframe n of the secondary cell in a primary cell.

Optionally, the first reference TDD UL-DL configuration uses a public uplink subframe set or a public uplink subframe subset of the same time in a primary cell and the secondary cell as uplink subframes, and other subframes are the TDD UL-DL configuration of the downlink subframe.

Optionally, if the downlink subframe of the secondary cell corresponds to at least two types of the first reference TDD UL-DL configurations, the k, determined according to the first reference TDD UL-DL configuration that the subframe n of the secondary cell corresponds to and is determined by the user equipment from the at least two types of the first reference TDD UL-DL configurations, is a subframe index of a subframe that feeds back the subframe n of the secondary cell in a primary cell.

Optionally, if the subframe n of the primary cell is a downlink subframe, the sending unit is further configured to send PDCCH to the user equipment on the subframe n of the primary cell, where the PDCCH is used to schedule the PDSCH of the subframe n of the secondary cell.

Optionally, if the subframe n of the primary cell is an uplink subframe, the sending unit does not schedule PDSCH of the subframe n of the secondary cell.

For the effects of the solution, reference may be made to FIG. 14.

Figure 21:
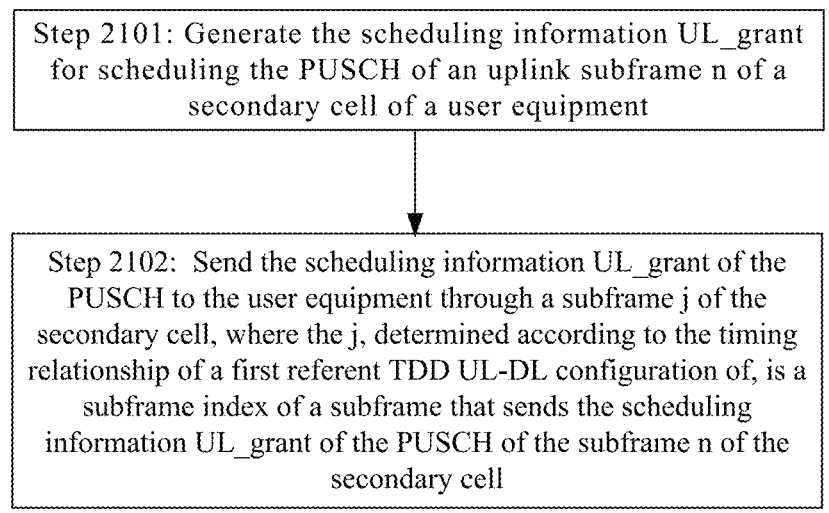
FIG. 21 is another flowchart of a communication method of an embodiment of the present invention.

An embodiment of the present invention provides a communication method for a CA system, based on a UE. As shown in FIG. 21, the embodiment includes the following steps.

Step 2101: Generate scheduling information UL_grant for scheduling PUSCH of an uplink subframe n of a secondary cell of a user equipment.

Step 2102: Send the scheduling information UL_grant of PUSCH to the user equipment through the subframe j of the primary cell, where the j, determined according to the uplink scheduling timing relationship of the first reference TDD UL-DL configuration, is a subframe index of a subframe that sends the scheduling information UL_grant of PUSCH of the subframe n of the secondary cell.

Optionally, the uplink scheduling timing relationship of the first reference TDD UL-DL configuration includes: the timing relationship of PUSCH to which UL_grant corresponds, or the timing relationship of PHICH to which PUSCH corresponds, where PHICH is the downlink ACK/NACK.

Optionally, of the first reference TDD UL-DL configuration is the TDD UL-DL configuration of the primary cell, or the TDD UL-DL configuration of the secondary cell, or a TDD UL-DL configuration 0, or a TDD UL-DL configuration 6, or a TDD UL-DL configuration 1.

Optionally, the j, determined according to a part of uplink scheduling timing relationships on at least one HARQ process of TDD UL-DL configuration, is a subframe index of a subframe that sends the scheduling information UL_grant of PUSCH of the uplink subframe n of the secondary cell. The first reference TDD UL-DL configuration may be configuration 0 or 6.

Optionally, the j, determined according to a part of or all uplink scheduling timing relationships on at least one uplink index of the first reference TDD UL-DL configuration, is a subframe index of a subframe that sends the scheduling information UL_grant of PUSCH of the uplink subframe n of the secondary cell. The first reference TDD UL-DL configuration may be configuration 0.

The method of the embodiment (steps 2101 and 2102) (including the following UE side method and double-side apparatus) may still be applied to a dynamic subframe scenario. Specifically, a single cell (namely, a single-carrier) is taken as an example. When the TDD UL-DL configuration is notified through the broadcasting information, the TDD configuration is also named backward-compatibility TDD configuration, and if the notified current configuration is configuration 2, that is, DL:UL is 4:1 (down down up down down down down up down down), the to-be-evolved TDD system will introduce the dynamic subframe technology, that is, certain subframes in configuration 2 may be dynamically set to be uplink or downlink, for example, subframes 3 and 4 in configuration 2, that is, down down up dynamic down down down up dynamic down ("dynamic" indicates a dynamic subframe), and the dynamic subframe base station may schedule the UE to send uplink data PUSCH or uplink ACK/NACK; otherwise, the UE tests PDCCH and other downlink control channels for the downlink subframe according to the default. Once a dynamic subframe is used to be uplink at a certain moment, the UL_grant that is sent on the dynamic subframe based on the original time sequence fails to be sent, and the original time sequence may be indicated as a first time sequence, that is, the time sequence determined by the TDD UL-DL configuration that is determined based on the broadcasting information, for example, the uplink scheduling time sequence of the configuration 2 is a dynamic subframe and used to be uplink, the UL_grant to which subframes 2 and 7 based on the first time sequence corresponds fails to be sent. At this moment, a second time sequence may be introduced, which is similar to the timing relationship of the first reference TDD UL-DL configuration in the embodiment, and the second time sequence is used to determine uplink scheduling and PHICH feedback time sequence.

Figure 22:
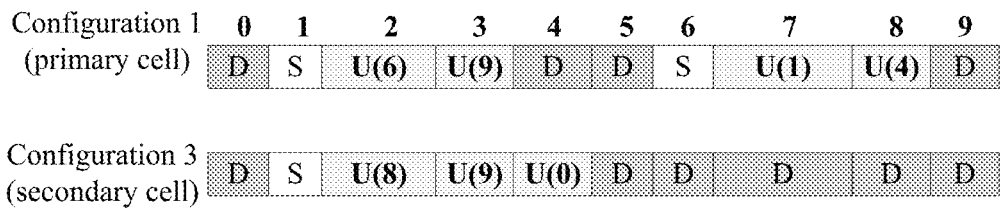
FIG. 22 is a schematic diagram of an UL-DL configuration of a CA system of an embodiment of the present invention.

For example, as shown in FIG. 22, it is assumed that the primary cell is the TDD UL-DL configuration 0, the secondary cell is a TDD UL-DL configuration 3, both cells are aggregated to one UE for data transmission, and it is assumed that the UL_grant to which the PDCCH of the secondary cell corresponds is sent in a primary cell, that is, in a uplink cross-carrier scheduling scenario, and it is assumed that the downlink ACK/NACK, also named physical HARQ indication channel (Physical HARQ Indicator Channel, PHICH) must be fed back in a primary cell.

At this moment, if the secondary cell sends the UL_grant according to the uplink scheduling timing of the secondary cell, the sending subframe of the UL_grant of the scheduling subframe 2 is the subframe 8, but the subframe 8 of the primary cell is an uplink subframe and fails to send the UL_grant, and because the subframe 4 of the primary cell is downlink, and the primary cell does not have the uplink scheduling timing of the uplink subframe 4 of the secondary cell, the secondary cell fails to send the UL_grant or corresponding PHICH according to the primary cell or a complete suite of uplink scheduling timing of the secondary cell. In this way, the secondary cell may send the UL_grant and the corresponding PHICH according to the uplink scheduling timing of the first reference TDD UL-DL configuration, and the first reference TDD UL-DL configuration may be configuration 0 or 6.

As shown in FIG. 23, it is assumed that the primary cell is the TDD UL-DL configuration 0, the secondary cell is the TDD UL-DL configuration 1, both cells are aggregated to one UE for data transmission, the PDSCH to which the PDCCH of the secondary cell corresponds is sent to the primary cell, that is, in a cross-carrier scheduling scenario, and it is assumed that the PHICH must be fed back in a primary cell. At this moment, the secondary cell sends the UL_grant and the corresponding PHICH according to the uplink timing relationship of the primary cell. Specifically, the uplink scheduling timing of the primary cell is in closing cycle mode.

A HARQ process is taken as an example, where the uplink timing of the HARQ process of the data packet PUSCH of the subframe 2 is {(5 or 6)→2, 6→3, 0→4, 0→7, 1→8, 5→9, 5→2}, where the first item within braces is the timing of the UL_grant to an initial transmission packet PUSCH, and each of the remaining items is the timing of PHICH to the retransmission packet PUSCH of the initial transmission packet. If the secondary cell sends the UL_grant and PHICH according to the timing of the primary cell, the timing is {(5 or 6)→2, 6→3, 0→7, 1→8, 5→2}, or {5→2, 6→3, 0→7, 1→8, 5→2}, or {6→2, 6→3, 0→7, 1→8, 5→2}, where the first item is the timing of the UL_grant to an initial transmission packet PUSCH, and each of the remaining items is the timing of PHICH to the retransmission packet PUSCH of the initial transmission packet.

Based on the above, the three timing is a part of the uplink timing of the HARQ process of the subframe 2 in TDD configuration 0 of the primary cell, and because the subframes 4 and 9 of the secondary cell are both downlink subframes and the secondary cell does not need to do send the UL_grant and the corresponding PHICH according to the uplink timing of the primary cell. Further specifically, the latter two of the three timing only use one set of the two sets of timing of the uplink index in the UL_grant, namely, a part of {(5 or 6)→2}, that is 5→2 or 6→2, because the number of the uplink subframe of the primary cell is more than the number of downlink subframes, and then the uplink index field in the UL_grant is required to make the UL_grant to schedule two uplink subframes, and the ratio of uplink and downlink subframes of the secondary cell is 4:6, that is, the uplink index is not required, and then it is enough to determine one set in two sets of timing of the uplink index of the primary cell; or when adopting two sets of timing of the uplink index, it only needs to add the uplink index field to the UL_grant of the secondary cell, where the field may be a newly added bit, a scrambling code, or reuse the current bit, such as reusing the downlink assignment indication (DAI, Downlink Assignment Index) of the UL_grant, and for this example, reference may be made to the primary cell (UL-DL configuration 0, a ratio of 6:4 of uplink and downlink subframes)+secondary cell (UL-DL configuration 6, a ratio of 5:5 of uplink and downlink subframes), because each uplink subframe of the configuration 6 only needs to feed back one uplink ACK/NACK to which a downlink subframe corresponds, and then DAI in the UL_grant of the secondary cell may be reused as an uplink index.

Similarly, it is assumed that the backward-compatibility TDD UL-DL configuration is configuration 2 and a dynamic subframe exists, and the directions of 10 subframes of a wireless frame are respectively down down up dynamic down down down up dynamic down, for an evolved UE, the time sequence relationship may depend on the second time sequence, for example, the second time sequence is used to determine the uplink scheduling and PHICH feedback time sequence, similar to the first reference TDD UL-DL configuration. For example, the second time sequence may be the timing relationship of the TDD UL-DL configuration 0. In this situation, the UE may determine, according to a part of uplink scheduling timing relationship of at least one HARQ process of the TDD UL-DL configuration 0, the subframe that sends the scheduling information UL_grant of PUSCH of the uplink subframe n.

Furthermore, the UE may determine, according to a part of or all timing relationships in the uplink scheduling timing relationships of at least one uplink index of the TDD UL-DL configuration 0, the subframe that sends the scheduling information UL_grant of PUSCH of the uplink subframe n. For detailed examples, reference may be made to the foregoing examples about the primary and secondary cells except that the timing of the primary cell is understood as the timing of the backward-compatibility TDD UL-DL configuration, such as the foregoing configuration 2, and the timing of the secondary cell is understood as the timing determined by the foregoing second time sequence, such as timing determined by the foregoing configuration 0.

For another example, as shown in FIG. 24, it is assumed that the primary cell is the TDD UL-DL configuration 0, the secondary cell is a TDD UL-DL configuration 2, both cells are aggregated to one UE for data transmission, and it is assumed that the UL_grant to which the PUSCH of the secondary cell corresponds is sent to the primary cell, that is, in a cross-carrier scheduling scenario, and it is assumed that the PHICH must be fed back in a primary cell. If the secondary cell sends the UL_grant and corresponding PHICH according to its own uplink scheduling timing, the sending is performed on subframes 3 and 8. However, the subframes 3 and 8 of the primary cell are both uplink subframes and fail to send the UL_grant and PHICH. At this moment, if the uplink scheduling timing of the primary cell is adopted, the round trip time of the uplink HARQ is relatively long, because the uplink scheduling timing of the TDD UL-DL configuration 0 adopts the cycling mode. Therefore, the secondary cell may send the UL_grant and corresponding PHICH according to reference configuration, and the reference configuration may be the TDD UL-DL configuration 1, that is, the UL_grant and PHICH of uplink subframes 2 and 7 of the secondary cell may be respectively sent to subframes 6 and 1 of the primary cell to ensure short round trip time of the uplink HARQ.

Optionally, if a primary cell and a secondary cell have different TDD UL-DL configurations and the following conditions exist: for a first subframe, the subframe of the primary cell is an uplink subframe while that of the secondary cell is a downlink subframe; for a second subframe, the subframe of the primary cell is a downlink subframe while that of the secondary cell is an uplink subframe (vice versa), the uplink scheduling of the secondary cell fails to be scheduled according to the uplink scheduling timing of the primary cell or the secondary cell, and the secondary cell may be scheduled according to scheduling timing of the TDD UL-DL configuration 1. For example, the primary cell is configuration 2 and the secondary cell is configuration 3, or the primary cell is configuration 2 and the secondary cell is configuration 4, still or the primary cell is configuration 1 and the secondary cell is configuration 3.

Optionally, if the round trip latency of the uplink HARQ of the primary cell or the secondary cell is larger than 10 subframes, the secondary cell may perform uplink scheduling according to the uplink scheduling timing of the TDD UL-DL configuration 1. Specifically, the round trip latency of uplink HARQ of TDD UL-DL configurations 1 to 5, that is, the latency from a PUSCH initial transmission packet of a subframe to first sending of the retransmission packet to which the initial transmission packet corresponds is 10 subframes. For TDD UL-DL configuration 0 or 6, the round trip latency of the uplink HARQ is larger than 10 subframes. If the configuration 0 or 6 is used to be the first reference TDD UL-DL configuration in the future, the sending time of some PUSCH retransmission packets of the secondary cell are not uplink subframes in a secondary cell, and the secondary cell may perform uplink scheduling according to uplink scheduling timing of the TDD UL-DL configuration 1, that is, to consider the TDD UL-DL configuration 1 as the first reference TDD UL-DL configuration.

Optionally, if the uplink subframe of the secondary cell corresponds to at least two types of the first reference TDD UL-DL configurations, further including: determining the first reference TDD UL-DL configuration to which the subframe n of the secondary cell corresponds from the at least two types of the first reference TDD UL-DL configurations; the j, determined according to the uplink scheduling relationship of the first reference TDD UL-DL configuration to which the subframe n of the secondary cell corresponds, is a subframe index of a subframe that sends the scheduling information UL_grant of PUSCH of the subframe n of the secondary cell.

For example, as shown in FIG. 25, it is assumed that the primary cell is the TDD UL-DL configuration 2, the secondary cell is the TDD UL-DL configuration 1, both cells are aggregated to one UE for data transmission, and it is assumed that the PDSCH to which the PDCCH of the secondary cell corresponds is sent to the primary cell, that is, in a cross-carrier scheduling scenario, and it is assumed that the PHICH must be fed back in a primary cell. It is assumed that the uplink subframes 3 and 8 of the secondary cell form a first subframe group, and uplink subframes 2 and 7 form a second subframe group, the uplink scheduling timing of the first subframe group may be performed according to the uplink scheduling timing of the secondary cell (a second reference TDD UL-DL configuration), that is, to send the UL_grant and corresponding PHICH respectively on subframes 9 and 4 of the primary cell; at this moment, PHICH may be not sent because the primary cell does not have PHICH resources of a backward-compatibility system; the uplink scheduling timing of the second subframe group may be performed according to the uplink scheduling timing of the primary cell (a third reference TDD UL-DL configuration), that is, to send the UL_grant and corresponding PHICH respectively on the subframes 8 and 3 of the primary cell to ensure short UL_grant scheduling latency, and the corresponding subframe of the primary cell has PHICH resources of a backward-compatibility system.

The method provided by the embodiment for a CA system, in the CA system where each carrier has a distinct UL-DL configuration, can effectively ensure that PUSCH of the SCell is normally scheduled, and effectively ensure normal communication between the base station and the UE.

An embodiment of the present invention provides a base station for a CA system, for performing the foregoing method, include the following units.

A processing unit, configured to generate scheduling information UL_grant for scheduling PUSCH of an uplink subframe n of a secondary cell of a user equipment, and configured for, determined according to the timing relationship of the uplink scheduling of a first reference TDD UL-DL configuration, a subframe index j of a subframe that sends the scheduling information UL_grant of PUSCH of the subframe n of the secondary cell;

A sending unit, configured to send, according to the subframe j of the primary cell, the UL_grant generated by the processing unit to a user equipment.

Optionally, the uplink scheduling timing relationship of the first reference TDD UL-DL configuration includes: the timing relationship of PUSCH to which UL_grant corresponds, or the timing relationship of PHICH to which PUSCH corresponds, where PHICH is the downlink ACK/NACK.

Optionally, the first reference TDD UL-DL configuration is the TDD UL-DL configuration of the primary cell, or the TDD UL-DL configuration of the secondary cell, or a TDD UL-DL configuration 0, or a TDD UL-DL configuration 6, or a TDD UL-DL configuration 1.

Optionally, if the first reference TDD UL-DL configuration is the TDD UL-DL configuration 6, the processing unit is specifically configured to determine, according to a part of uplink scheduling timing relationships on at least one HARQ process of the TDD UL-DL configuration 6, a subframe index j of a subframe that sends the scheduling information UL_grant of PUSCH of the uplink subframe n of the secondary cell.

Optionally, if the first reference TDD UL-DL configuration is the TDD UL-DL configuration 0, the processing unit is specifically configured to determine, according to a part of or all uplink scheduling timing relationships of at least one uplink index process of the TDD UL-DL configuration 0, a subframe index of a subframe that sends the scheduling information UL_grant of PUSCH of the uplink subframe n of the secondary cell.

Optionally, if the uplink subframe of the secondary cell corresponds to at least two types of the first reference TDD UL-DL configurations, the processing unit is further configured to determine the first reference TDD UL-DL configuration to which the subframe n of the secondary cell corresponds from the at least two types of the first reference TDD UL-DL configurations, and specifically configured to determine, according to the uplink scheduling relationship of the first reference TDD UL-DL configuration to which the subframe n of the secondary cell corresponds, a subframe index j of a subframe that sends the scheduling information UL_grant of PUSCH of the subframe n of the secondary cell.

The base station provided by the embodiment for a CA system, in the CA system where each carrier has a distinct UL-DL configuration, can effectively ensure that PUSCH of the SCell is normally scheduled, and effectively ensure normal communication between the base station and the UE.

An embodiment of the present invention provides a communication method for a CA system, based on a user equipment. The embodiment includes the following steps receiving the scheduling information UL_grant of the PUSCH information of the subframe n of the secondary cell, sent by a base station on a subframe j of a primary cell, where the j, determined according to the timing relationship of the uplink scheduling of the first reference TDD UL-DL configuration, is a subframe index of a subframe that sends the scheduling information UL_grant of PUSCH of the subframe n of the secondary cell, and according to the scheduling information UL_grant of the PUSCH, sending the PUSCH on the subframe n of the secondary cell.

Optionally, the uplink scheduling timing relationship of the first reference TDD i UL-DL configuration includes: the timing relationship of PUSCH to which UL_grant corresponds, or the timing relationship of PHICH to which PUSCH corresponds, where PHICH is the downlink ACK/NACK.

Optionally, the first reference TDD UL-DL configuration is the TDD UL-DL configuration of the primary cell, or the TDD UL-DL configuration of the secondary cell, or a TDD UL-DL configuration 0, or a TDD UL-DL configuration 6, or a TDD UL-DL configuration 1.

Optionally, if the first reference TDD UL-DL configuration is the TDD UL-DL configuration 6, the j, determined according to a part of upstream scheduling timing relationships of at least one HARQ process of the TDD UL-DL configuration 6, is a subframe index of a subframe that sends the scheduling information UL_grant of PUSCH of the subframe n of the secondary cell.

Optionally, if the first reference TDD UL-DL configuration is the TDD UL-DL configuration 0, the j, determined according to a part of or all upstream scheduling timing relationships of at least one uplink index of the TDD UL-DL configuration 6, is a subframe index of a subframe that sends the scheduling information UL_grant of PUSCH of the subframe n of the secondary cell.

Optionally, if the uplink subframe of the secondary cell corresponds to at least two types of the first reference TDD UL-DL configurations, further including: determining the first reference TDD UL-DL configuration to which the subframe n of the secondary cell corresponds from the at least two types of the first reference TDD UL-DL configurations; the j, determined according to the uplink scheduling relationship of the first reference TDD UL-DL configuration to which the subframe n of the secondary cell corresponds, is a subframe index of a subframe that sends the scheduling information UL_grant of PUSCH of the subframe n of the secondary cell.

The method provided by the embodiment for a CA system, in the CA system where each carrier has a distinct UL-DL configuration, can effectively ensure that PUSCH of the SCell is normally scheduled, and effectively ensure normal communication between the base station and the UE.

An embodiment of the present invention provides a user equipment for a CA system, for performing the foregoing method, including a receiving unit, configure to receive the scheduling information UL_grant of the PUSCH information of the subframe n of the secondary cell, sent by a base station on a subframe j of a primary cell, where the j, determined by the base station according to the timing relationship of the uplink scheduling of the first reference TDD UL-DL configuration, is a subframe index of a subframe that sends the scheduling information UL_grant of PUSCH of the subframe n of the secondary cell, and a sending unit, configured to send, according to the scheduling information UL_grant of the PUSCH of the processing unit, the PUSCH on the subframe n of the secondary cell.

Optionally, the uplink scheduling timing relationship of the first reference TDD UL-DL configuration includes the timing relationship of PUSCH to which UL_grant corresponds, or the timing relationship of PHICH to which PUSCH corresponds, where PHICH is the downlink ACK/NACK.

Optionally, the first reference TDD UL-DL configuration is the TDD UL-DL configuration of the primary cell, or the TDD UL-DL configuration of the secondary cell, or a TDD UL-DL configuration 0, or a TDD UL-DL configuration 6, or a TDD UL-DL configuration 1.

Optionally, if the first reference TDD UL-DL configuration is the TDD UL-DL configuration 6, the j, determined according to a part of uplink scheduling timing relationships of at least one HARQ process of the TDD UL-DL configuration 6, is a subframe index of a subframe that sends the scheduling information UL_grant of PUSCH of the subframe n of the secondary cell.

Optionally, if the first reference TDD UL-DL configuration is the TDD UL-DL configuration 0, the j, determined according to a part of or all uplink scheduling timing relationships of at least one uplink index of the TDD UL-DL configuration 6, is a subframe index of a subframe that sends the scheduling information UL_grant of PUSCH of the subframe n of the secondary cell.

Optionally, if the subframe of the secondary cell corresponds to at least two types of the first reference TDD UL-DL configuration, the j, determined by the base station according to the at least two types of the first reference TDD UL-DL configuration and determined by the uplink scheduling timing relationship of the first reference TDD UL-DL configuration to which the subframe n of the secondary cell corresponds, is a subframe index of a subframe that sends the scheduling information UL_grant of PUSCH of the subframe n of the secondary cell.

The user equipment provided by the embodiment for a CA system, in the CA system where each carrier has a distinct UL-DL configuration, can effectively ensure that PUSCH of the SCell is normally scheduled, and effectively ensure normal communication between the base station and the UE.

Persons of ordinary skill in the art should understand that all or a part of the processes of the methods in the embodiments may be implemented by a computer program instructing relevant hardware. The program may be stored in a computer readable storage medium. When the program is run, the steps of the methods in the embodiments are performed. The storage medium may be any medium capable of storing program codes, such as a ROM, a RAM, a magnetic disk, an optical disk, and the like.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A communication method for a carrier aggregation system, the method comprising:
   receiving physical downlink share channel (PDSCH) information sent by a base station through a subframe n of a secondary cell; and
   feeding back an ACK/NACK of the sent PDSCH information on a subframe m or a subframe p of a primary cell, wherein a subframe n of the primary cell is a downlink subframe and wherein m, determined according to the ACK/NACK timing relationship to which the subframe n of the primary cell corresponds, is a subframe index of a subframe that feeds back the ACK/NACK of the PDSCH of the subframe n of the primary cell in the primary cell, and p, determined according to the ACK/NACK timing relationship to which the subframe n of the secondary cell correspond, is a subframe index of a subframe that feeds back the ACK/NACK of the PDSCH of the subframe n of the secondary cell;
   wherein, n, m, and p are subframe indexes.

2. The communication method according to claim 1, further comprising receiving physical downlink control channel PDCCH information sent by the base station through the subframe n of the primary cell, wherein the PDCCH information is used to schedule the sent PDSCH information.

3. A communication method for a carrier aggregation system, comprising:
   receiving physical downlink share channel (PDSCH) information sent by a base station through a subframe n of a secondary cell;
   when a subframe p is an uplink subframe in a primary cell, feeding back an ACK/NACK of the sent PDSCH information on the subframe p of a primary cell;
   when the subframe p in the primary cell is a downlink subframe, according to a presetting or a notification of the base station, feeding back an ACK/NACK of the sent PDSCH information on an uplink subframe in the primary cell and specified by the presetting and the notification of the base station;
   wherein a subframe n is an uplink subframe in the primary cell;
   wherein the p, determined according to the ACK/NACK timing relationship to which the subframe n of the secondary cell corresponds, is a subframe index of a subframe that feeds back the ACK/NACK of the PDSCH of the subframe n of the secondary cell in the secondary cell; and
   wherein n and p are subframe indexes.

4. A communication method for a carrier aggregation system, the method comprising:
   sending physical downlink share channel (PDSCH) information to a user equipment through a subframe n of a secondary cell; and
   receiving an ACK/NACK of the sent PDSCH information sent by the user equipment on a subframe m or a subframe p of a primary cell;
   wherein a subframe n of a primary cell is a downlink subframe;
   wherein m, determined according to the ACK/NACK timing relationship to which the subframe n of the primary cell corresponds, is a subframe index of a subframe that feeds back the ACK/NACK of the PDSCH of the subframe n of the primary cell in a primary cell;
   wherein p, determined according to the ACK/NACK timing relationship to which the subframe n of the secondary cell corresponds, is a subframe index of a subframe that feeds back the ACK/NACK of the PDSCH of the subframe n of the secondary cell in a secondary cell; and wherein, n, m, and p are subframe indexes.

5. The communication method according to claim 4, wherein, before sending the PDSCH information to a user equipment through a subframe n of a secondary cell, the method further comprises sending physical downlink control channel PDCCH information on the subframe n of the primary cell, wherein the PDCCH information is used to schedule the sent PDSCH information.

6. The communication method according to claim 4, further comprising:

sending further physical downlink share channel PDSCH information to the user equipment through a subframe q of the secondary cell, wherein the subframe q of the primary cell is a downlink subframe if the subframe q of the primary cell is an uplink subframe, not scheduling PDSCH of the subframe q of the secondary cell.

7. A communication method for a carrier aggregation system, the method comprising:

sending physical downlink share channel (PDSCH) information to a user equipment through a subframe n of a secondary cell; and when a subframe p is an uplink subframe in a primary cell, receiving an ACK/NACK of the sent PDSCH information sent by the user equipment on the subframe p in the primary cell;

when the subframe p in the primary cell is a downlink subframe, receiving an ACK/NACK of the sent PDSCH information that is sent, according to a presetting or a notification of a base station, by a user equipment on an uplink subframe in the primary cell and specified by the presetting and the notification of the base station;

wherein a subframe n is an uplink subframe in the primary cell;

wherein p, determined according to the ACK/NACK timing relationship to which the subframe n of the secondary cell corresponds, is a subframe index of a subframe that feeds back the ACK/NACK of the PDSCH of the subframe n of the secondary cell in the secondary cell; and wherein n and p are subframe indexes.

8. A user equipment for a carrier aggregation system, the user equipment comprising:

a receiving unit, configured to receive physical downlink share channel (PDSCH) information sent by a base station through a subframe n of a secondary cell; and a feedback unit, configured to:

when a subframe n of a primary cell is a downlink subframe, feed back an ACK/NACK of the sent PDSCH information on a subframe m or a subframe p of the primary cell, wherein the m, determined according to an ACK/NACK timing relationship to which the subframe n of the primary cell corresponds, is a subframe index of a subframe that feeds back the ACK/NACK of the PDSCH of the subframe n of the primary cell in the primary cell, and the p, determined according to the ACK/NACK timing relationship to which the subframe n of the secondary cell corresponds, is a subframe index of a subframe that feeds back the ACK/NACK of the PDSCH of the subframe n of the secondary cell in the secondary cell;

when the subframe n of the primary cell is an uplink subframe and a subframe p is an uplink subframe in the primary cell, feed back an ACK/NACK of the sent PDSCH information on the subframe p of the primary cell; and when the subframe n of the primary cell is an uplink subframe and the subframe p in the primary cell is a downlink subframe, according to a presetting or a notification of the base station, feed back an ACK/NACK of the sent PDSCH information in an uplink subframe in the primary cell and specified by the presetting and the notification of the base station on;

wherein, n, m, and p are subframe indexes.

9. The user equipment according to claim 8, wherein the receiving unit is further configured to receive physical downlink control channel (PDCCH) information sent by the base station through the subframe n of the primary cell, wherein the PDCCH information is used to schedule the sent PDSCH information.

10. A base station for a carrier aggregation system, comprising:

a sending unit, configured to send physical downlink share channel PDSCH information to a user equipment through a subframe n of a secondary cell; and a receiving unit, configured to:

when the subframe n of a primary cell is a downlink subframe, receive an ACK/NACK of the sent PDSCH information sent by the user equipment on a subframe m or a subframe p of the primary cell, wherein m, determined according to an ACK/NACK timing relationship to which the subframe n of the primary cell corresponds, is a subframe index of a subframe that feeds back the ACK/NACK of the PDSCH of the subframe n of the primary cell in the primary cell, and p, determined according to the ACK/NACK timing relationship to which the subframe n of the secondary cell corresponds, is a subframe index of a subframe that feeds back the ACK/NACK of the PDSCH of the subframe n of the secondary cell in the secondary cell;

when the subframe n of the primary cell is an uplink subframe and a subframe p is an uplink subframe in the primary cell, receive an ACK/NACK of the sent PDSCH information sent by the user equipment on the subframe p on the primary cell; and when the subframe n of the primary cell is an uplink subframe and the subframe p in the primary cell is a downlink subframe, receive the ACK/NACK of the sent PDSCH information that is sent, according to a presetting or a notification of the base station, by the user equipment on an uplink subframe in the primary cell and specified by the presetting and the notification of the base station;

wherein, n, m, and p are subframe indexes.

11. The base station according to claim 10, wherein the receiving unit is further configured to send physical downlink control channel (PDCCH) information on the subframe n of the primary cell, wherein the PDCCH information is used to schedule the sent PDSCH information.

12. The base station according to claim 10, wherein the sending unit does not schedule PDSCH of the subframe n of the secondary cell when the subframe n of the primary cell is an uplink subframe.

* * * * *